United States Patent
Kim et al.

(10) Patent No.: US 8,765,023 B2
(45) Date of Patent: Jul. 1, 2014

(54) COMPOSITION FOR PREPARING SEPARATOR, METHOD FOR PREPARING SEPARATOR, AND ELECTROCHEMICAL DEVICE HAVING SEPARATOR PREPARED THEREFROM

(71) Applicants: Bong-Tae Kim, Daejeon (KR); Heon-Sik Song, Daejeon (KR); Cheon-Il Park, Daejeon (KR)

(72) Inventors: Bong-Tae Kim, Daejeon (KR); Heon-Sik Song, Daejeon (KR); Cheon-Il Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/930,970

(22) Filed: Jun. 28, 2013

(65) Prior Publication Data
US 2014/0011093 A1     Jan. 9, 2014

Related U.S. Application Data

(63) Continuation of application No. PCT/KR2012/005308, filed on Jul. 4, 2012.

(30) Foreign Application Priority Data

Jul. 4, 2011  (KR) .................. 10-2011-0066025
May 7, 2012  (KR) .................. 10-2012-0048257

(51) Int. Cl.
  *H01B 1/00*  (2006.01)
  *H01M 2/16*  (2006.01)
  *C08G 63/48*  (2006.01)
  *C08F 8/00*  (2006.01)
  *H01M 2/14*  (2006.01)

(52) U.S. Cl.
  CPC . *H01B 1/00* (2013.01); *H01M 2/14* (2013.01); *H01M 2/1653* (2013.01)
  USPC .............. 252/500; 525/50; 525/191; 429/249

(58) Field of Classification Search
  CPC ......... H01B 1/00; H01M 2/14; H01M 2/1653
  USPC .................. 252/500; 429/249; 525/50, 191
  See application file for complete search history.

(56) References Cited

U.S. PATENT DOCUMENTS

2009/0075049 A1    3/2009  Jung et al.
2011/0033743 A1*   2/2011  Lee et al. .................. 429/145
2011/0223485 A1*   9/2011  Kikuchi et al. ............. 429/246

FOREIGN PATENT DOCUMENTS

KR   10-2010-0120461 A   11/2010

OTHER PUBLICATIONS

International Search Report issued in International Application No.: PCT/KR2012/005308 on Jan. 28, 2013, 2 pages.

(Continued)

*Primary Examiner* — Harold Pyon
*Assistant Examiner* — Jaison Thomas
(74) *Attorney, Agent, or Firm* — Rothwell, Figg, Ernst & Manbeck, P.C.

(57) ABSTRACT

The present invention relates to a composition for preparing a separator for an electrochemical device, a method preparing a separator for an electrochemical device, and an electrochemical device having a separator prepared therefrom, more particularly, a composition for preparing a separator for an electrochemical device, comprising a polyolefin, a first diluent, and a second diluent, wherein an interaction energy between the first diluent and the second diluent is in the range of 2 to 3.5 cal/cm$^3$, a method preparing a separator for an electrochemical device using the composition, and an electrochemical device having a separator prepared therefrom. In accordance with the present invention, the pore size of a polyolefin separator can be suitably controlled into a size desired by a user, and the high-temperature stability and mechanical property of the separator can be remarkably improved, thereby enhancing the life time and stability of an electrochemical device having the same.

15 Claims, 15 Drawing Sheets

(56) References Cited

OTHER PUBLICATIONS

M.Y. Jeon et al.: "Phase behavior of polymer/diluent/diluent mixtures and their application to control microporous membrane structure," Journal of Membrane Science, vol. 300, 2007, pp. 172-181.

L.U. Kim et al.: "A Novel Method for the Pore Size Control of the Battery Separator Using the Phase instability of the Ternary Mixtures," Journal of Polymer Science: Part B: Polymer Physics, vol. 44, 2006, pp. 2025-2034.

* cited by examiner (a)

(b)

(a)

(b)

US 8,765,023 B2

COMPOSITION FOR PREPARING SEPARATOR, METHOD FOR PREPARING SEPARATOR, AND ELECTROCHEMICAL DEVICE HAVING SEPARATOR PREPARED THEREFROM

CROSS-REFERENCE TO RELATED APPLICATION

This application is a continuation of International Application No. PCT/KR2012/005308 filed on Jul. 4, 2012, which claims priority under 35 USC 119(a) to Korean Patent Application No. 10-2011-0066025 filed in the Republic of Korea on Jul. 4, 2011 and Korean Patent Application No. 10-2012-0048257 filed in the Republic of Korea on May 7, 2012, the disclosures of which are incorporated herein by reference.

TECHNICAL FIELD

The present invention relates to a composition for preparing a separator for an electrochemical device, a method preparing a separator for an electrochemical device, and an electrochemical device having a separator prepared therefrom. More particularly, the present invention relates to a composition for preparing a separator having improved high-temperature stability and mechanical property, which is used in an electrochemical device, a method preparing a separator using the same, and an electrochemical device having a separator prepared therefrom.

BACKGROUND ART

Recently, there has been an increasing interest in energy storage technology. Electrochemical devices have been widely used as energy sources in the fields of cellular phones, camcorders, notebook computers, PCs and electric cars, resulting in intensive research and development into them.

In this regard, electrochemical devices are one of the subjects of great interest. Particularly, development of rechargeable secondary batteries has been the focus of attention. Recently, research and development of such batteries are focused on the designs of new electrodes and batteries to improve capacity density and specific energy.

Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries.

The lithium secondary batteries consist of a cathode, an anode, a non-aqueous electrolyte solution and a separator. Among these, the separator should have the requirements so that while an electric insulator separates the cathode and the anode, the permeability of lithium ions is increased with the basis of high porosity which will eventually enhance ionic conductivity. As such a separator, a substrate made of a polyolefin-based polymer such as polyethylene have generally been used as it is favorable in terms of easy pore-formation, good chemical-resistance, mechanical property and thermal stability, as well as cheap price.

The preparation of a microporous separator from polyethylene has been widely conducted by a wet process which comprises mixing polyethylene with a diluent acting as a pore-forming agent, extruding the mixture, stretching the extruded resultant and extracting the diluent to prepare a microporous separator. However, such a wet process is not easy to suitably control the pore size of a porous membrane and is limited to sufficiently improving the high-temperature stability and good mechanical property of the polymer separator.

DISCLOSURE

Technical Problem

The present invention is designed to solve the problems of the prior art, and therefore it is an object of the present invention to provide a composition for preparing a separator having improved high-temperature stability and mechanical property, as well as a suitably controlled pore size, which is used in an electrochemical device, a method preparing a separator using the same, and an electrochemical device having a separator prepared therefrom.

Technical Solution

In accordance with one aspect of the present invention, there is provided a composition for preparing a separator for an electrochemical device, comprising a polyolefin, a first diluent, and a second diluent, wherein an interaction energy between the first diluent and the second diluent is in the range of 2 to 3.5 cal/cm$^3$.

In the present invention, the polyolefin may be selected from the group consisting of polyethylene, polypropylene, polybutylene, polypentene, and a mixture thereof. Also, the first diluent may be selected from the group consisting of aliphatic hydrocarbon solvents, vegetable oils, fatty acid ester-based solvents, dialkyl phthalates and a mixture thereof.

The second diluent may be a poly(tetramethylene ether) glycol or a polypropylene glycol.

In the composition for preparing a separator for an electrochemical device, the polyolefin, the first diluent and the second diluent may be comprised in an amount of 20 to 50 wt %, 38 to 79 wt %, and 1 to 12 wt %, respectively.

In addition, the second diluent may have a weight average molecular weight of 650 to 2,000.

Also, in accordance with another aspect of the present invention, there is provided a method for preparing a separator for an electrochemical device, comprising blending a polyolefin, a first diluent, and a second diluent to obtain a blend, and heating the blend at a temperature exceeding the crystallization temperature of the polyolefin, to obtain a composition for preparing a separator in the form of a single-phase liquid; cooling the obtained single-phase liquid composition for preparing a separator to a temperature less than or equivalent to a temperature at which the blend is liquid-liquid phase separated, to carry out the phase separation of the composition; and extracting the first diluent and the second diluent from the phase-separated composition for preparing a separator using an extraction solvent at a temperature less than or equivalent to the crystallization temperature of the polyolefin, to obtain a separator having pores formed thereon, wherein an interaction energy between the first diluent and the second diluent is in the range of 2 to 3.5 cal/cm$^3$.

In the present invention, the heating of the blend may be carried out at a temperature of 115 to 260° C., and the cooling the composition for preparing a separator may be carried out at a temperature of 115° C. or less.

Further, in accordance with still another aspect of the present invention, there is provided a separator prepared by the above-mentioned method.

Furthermore, in accordance with still another aspect of the present invention, there is provided an electrochemical device, comprising a cathode, an anode, a non-aqueous electrolyte solution and the separator prepared by the above-mentioned method.

Advantageous Effects

In accordance with the present invention, the pore size of a polyolefin separator can be suitably controlled into a size desired by a user, and the high-temperature stability and mechanical property of the separator can be remarkably improved, thereby enhancing the life time and stability of an electrochemical device having the same.

DESCRIPTION OF DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

BEST MODE

Hereinafter, the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Also, configurations illustrating the embodiments and drawings proposed herein are just a preferable example for the purpose of illustrations only, not intended to limit the scope of the disclosure, so it should be understood that other equivalents and modifications could be made thereto without departing from the spirit and scope of the disclosure.

The present invention provides a composition for preparing a separator for an electrochemical device, comprising a polyolefin, a first diluent, and a second diluent, wherein an interaction energy between the first diluent and the second diluent is in the range of 2 to 3.5 cal/cm$^3$.

In the embodiments for illustrating the present invention, poly(tetramethylene ether) glycols having a weight average molecular weight of 650, 1,000, 1,400 and 2,000, respectively, are used together with paraffin oil to form a single-phase. The formation of the single-phase implies that such poly(tetramethylene ether) glycols can be used as a diluent.

Figure 6:
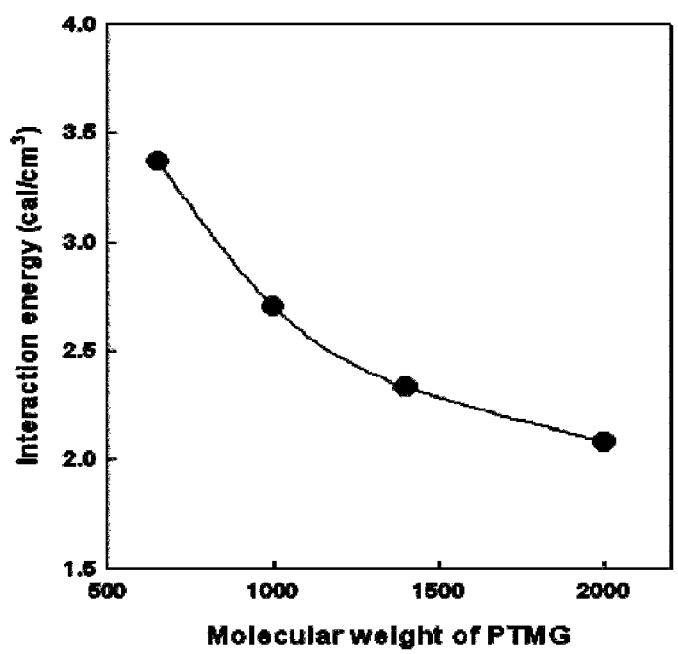
FIG. 6 shows the variation of an interaction energy between paraffin oil and poly(tetramethylene ether) glycol (PTMG) depending on the weight average molecular weight of PTMG.

FIG. 6 shows the variation of an interaction energy between paraffin oil and poly(tetramethylene ether) glycol (PTMG) depending on the weight average molecular weight of PTMG, wherein the interaction energy is 3.37 cal/cm$^3$ when PTMG has a weight average molecular weight of 650, and the interaction energy is 2.06 cal/cm$^3$ when PTMG has a weight average molecular weight of 2,000. From this, it can be seen that a single-phase is formed when an interaction energy between the first diluent and the second diluent is in the range of 2 to 3.5 cal/cm$^3$, preferably 2.06 to 3.37 cal/cm$^3$, but is not limited thereto, and the diluents satisfying such an interaction energy can be used for diluting polyolefin.

The composition for preparing a separator for an electrochemical device can suitably control the pore size of a polyolefin-based separator prepared therefrom, thereby providing remarkable enhanced high-temperature stability and mechanical property to the separator.

The polyolefin which may be used in the present invention includes polyethylene, polypropylene, polybutylene, polypentene and the like, but is not limited thereto.

In the present invention, the first diluent may be any one known to be conventionally used in the preparation of a polyolefin-based separator. Specific examples of such a diluent includes plasticizers, for example, aliphatic hydrocarbon solvents such as paraffin oil and mineral oil; vegetable oils such as soybean oil, sunflower oil, palm oil, olive oil, corn oil, cotton seed oil, sesame seed oil and perilla oil; dialkyl phthalates such as dioctyl phthalate (DOP), dibutyl phthalate, butylbenzil phthalate, diisodecyl phthalate, diisononyl phthalate, diethylhexyl phthalate, diethyl phthalate, dipentyl phthalate and dipropyl phthalate; and a mixture thereof.

Also, the second diluent may be a poly(tetramethylene ether) glycol or a polypropylene glycol, but is not limited thereto.

In the composition for preparing a separator for an electrochemical device, the polyolefin, the first diluent and the second diluent may be comprised in an amount of 20 to 50 wt %, 38 to 79 wt %, and 1 to 12 wt %, respectively, but are not limited thereto. Such numerical ranges may be suitably varied so that the separator to be prepared has a desired pore size depending on the use condition thereof.

In addition, the second diluent may have a weight average molecular weight of 650 to 2,000, or 1,000 to 2,000. When the second diluent satisfies such a weight average molecular weight range, it has good miscibility with the first diluent to allow the obtainment of pores having an increased size.

Also, the present invention provides a method for preparing a separator for an electrochemical device as follows:

First, a polyolefin, a first diluent and a second diluent are blended to obtain a blend, and the blend is heated at a temperature exceeding the crystallization temperature of the polyolefin, to obtain a composition for preparing a separator in the form of a single-phase liquid. At this time, an interaction energy between the first diluent and the second diluent is in the range of 2 to 3.5 cal/cm$^3$.

The crystallization temperature of the polyolefin refers to as a temperature at which the crystal of the polyolefin is formed from the blend, and it depends on the conditions including the content of the polyolefin, the kind of the first diluent, and the molecular weight and content of the second diluent, but generally ranges from 115 to 135° C. If the blend is heated at a temperature exceeding such a crystallization temperature range, the composition for preparing a separator can be obtained in the form of a single-phase liquid. Also, the heating temperature should not exceed the evaporation temperature of the first and second diluents, wherein the evaporation temperature may vary depending on the condition and composition of the blend, but generally ranges from 270 to 290° C.

Thus, the heating of the blend may be carried out at a temperature of 115 to 290° C., or 115 to 260° C. When satisfying such a heating temperature condition, the heat-temperature stability of the separator to be prepared can be ensured, and pores having an increased size can be obtained as the liquid-liquid phase separation time increases.

Subsequently, the obtained single-phase liquid composition for preparing a separator is cooled to a temperature less than or equivalent to a temperature at which the blend is liquid-liquid phase separated, to carry out the phase separation of the composition.

The liquid-liquid phase separation temperature may vary depending on the content of the polyolefin, and the content and molecular weight of the first and second diluents comprised in the blend, and range from the crystallization temperature (115~135° C.) of the polyolefin from the evaporation temperature (270~290° C.) of the first and second diluents. Through the phase separation procedure, the liquid phase of the polyolefin is separated from the mixed phase of the first and second diluents.

Thus, the cooling of the composition for preparing a separator may be carried out at a temperature of 115° C. or less, 115 to 120° C., or 115 to 135° C. When satisfying such a cooling temperature condition, solid-liquid phase separation occurs, while the separated diluents of a liquid-liquid phase are isolated in a continuous phase by polymer crystallization.

Then, the first diluent and the second diluent are extracted from the phase-separated composition for preparing a separator using an extraction solvent at a temperature less than or equivalent to the crystallization temperature of the polyolefin, to obtain a separator having pores formed thereon.

The extraction solvent which may be used in the present invention includes diethyl ether, dimethyl ether, methylene chloride, ethyl acetate, methyl ethyl ketone, and hexane.

Further, in accordance with still another aspect of the present invention, there is provided a separator prepared by the above-mentioned method.

Furthermore, in accordance with still another aspect of the present invention, there is provided an electrochemical device, comprising a cathode, an anode, a non-aqueous electrolyte solution and the separator prepared by the above-mentioned method.

The electrochemical device according to one embodiment of the present invention may include any device in which electrochemical reactions may occur, and specific examples of the electrochemical device include all kinds of primary batteries, secondary batteries, fuel cells, solar cells or capacitors such as a super capacitor. In particular, among the secondary batteries, lithium secondary batteries including a lithium metal secondary battery, a lithium ion secondary battery, a lithium polymer secondary battery or a lithium ion polymer secondary battery are preferred.

In the electrochemical device according to one embodiment of the present invention, electrodes used therein are not particularly limited and may be manufactured by binding an electrode active material to an electrode current collector according to a conventional method known in the art. Among usable electrode active materials, a cathode active material may be any one that is commonly used in cathodes of conventional electrochemical devices. Non-limiting examples of the cathode active material include lithium manganese oxides, lithium cobalt oxides, lithium nickel oxides, lithium iron oxides, and lithium composite oxides thereof. An anode active material may be any one that is commonly used in anodes of conventional electrochemical devices. Non-limiting examples of the anode active material include lithium, lithium alloys, and lithium intercalation materials such as carbon, petroleum coke, activated carbon, graphite and other carbonaceous materials. Non-limiting examples of a cathode current collector include aluminum foils, nickel foils and a combination thereof. Non-limiting examples of an anode current collector include copper foils, gold foils, nickel foils, copper alloy foils and a combination thereof.

The non-aqueous electrolyte solution used in the electrochemical device according to one embodiment of the present invention comprises a lithium salt as an electrolyte salt. The lithium salt may include any one which is conventionally used in an electrolyte solution for a lithium secondary battery. The examples of an anion composing the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The non-aqueous electrolyte solution comprises an organic solvent which is conventionally used in an electrolyte solution for a lithium secondary battery, for example, an ether, an ester, an amide, a linear carbonate, a cyclic carbonate or a mixture thereof.

Among these, a linear carbonate, a cyclic carbonate, or a mixture thereof is representatively used.

The cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, a halide thereof, and a mixture thereof. The halide may be fluoroethylene carbonate (FEC), but is not limited thereto.

Also, the linear carbonate compound may be any one selected from the group consisting of dimethyl carbonate (DMC), diethyl carbonate (DEC), dipropyl carbonate, ethyl methyl carbonate (EMC), methyl propyl carbonate, ethyl propyl carbonate and a mixture thereof, but is not limited thereto.

In particular, among the above carbonate-based organic solvents, the cyclic carbonates such as ethylene carbonate and propylene carbonate have a high viscosity and a high dielectric constant to more easily dissociate a lithium salt in an electrolyte. Such a cyclic carbonate may be mixed with a linear carbonate, such as dimethyl carbonate and diethyl carbonate, having a low viscosity and a low dielectric constant in a suitable ratio, to provide an electrolyte solution having a high electric conductivity.

Also, the ether which may be used as the organic solvent is any one selected from the group consisting of dimethyl ether, diethyl ether, dipropyl ether, methyl ethyl ether, methyl propyl ether, ethyl propyl ether and a mixture thereof, but is not limited thereto. In addition, the ester which may be used as the organic solvent is any one selected from the group consisting of methyl acetate, ethyl acetate, propyl acetate, methyl propionate, ethyl propionate, γ-butyrolactone, γ-valerolactone, γ-caprolactone, σ-valerolactone, ϵ-caprolactone and a mixture thereof, but is not limited thereto.

The non-aqueous electrolyte solution may be introduced in any suitable step during the manufacturing of the electrochemical device depending on the manufacturing processes and desired physical properties of a final product. That is, the non-aqueous electrolyte solution may be introduced before the assembling of the electrochemical device or in the final step of the assembling of the electrochemical device.

The electrochemical device of the present invention may be manufactured by lamination (or stacking) and folding of a separator and electrodes, as well as a general winding process. Also, the electrochemical device of the present invention is not limited to its shape, but may be a cylindrical shape using a can, a prismatic shape, a pouch shape or a coin shape.

The foregoing description is given by way of illustration only, and various changes and modifications within the spirit and scope of the present invention will become apparent to those skilled in the art therefrom. Therefore, the embodiments proposed herein are provided for explaining the spirit and scope of the present invention, not intended for limitation, so they should not be interpreted as limiting the scope of the invention. The scope of the present invention to be protected is defined by the appended claims, and it should be recognized that all equivalents fall within the scope of the invention as defined in the appended claims.

Hereinafter, various preferred examples of the present invention will be described in detail for better understanding. However, the examples of the present invention may be modified in various ways, and they should not be interpreted as limiting the scope of the invention. The examples of the present invention are provided for better understanding of the invention to persons having ordinary skill in the art.

Reference Example: Phase Behavior Experiment of Polyolefin/Diluent Blends (1) Experimental Method Generally, a polyolefin/diluent blend used in the preparation of a separator for a secondary battery is represented by an upper critical solution temperature (UCST) behavior which forms a mixture having one phase at a high temperature, but is phase-separated in two phases at a low temperature.

In order to observe phase behaviors represented depending on the kind of a used diluent, a polyethylene/diluent blend was heated to a one phase-forming temperature or higher to form a one-phase blend, and then cooled at a rate of 5° C./min. In the meantime, when the polyethylene/diluent blend started to become liquid-liquid separated, separation temperatures were approximately measured. At this time, a temperature at which a droplet of the polyethylene/diluent blend is first formed was regarded as an approximate separation temperature. In order to determine a true equilibrium phase separation temperature, an annealing technique was applied. Specifically, the polyethylene/diluent blend was heated to a one phase-forming temperature or higher, cooled at about the pre-observed approximate separation temperature, and then observed for its phase separation with maintaining 5 minutes at a certain annealing temperature. If the phase separation of the blend did not occur, the same procedure was repeated by lowering the annealing temperature. If the phase separation of the blend occurred, the same procedure was repeated by raising the annealing temperature. Thus, the annealing procedure was repeated to determine the highest temperature, at which phase separation was observed, as the true equilibrium phase separation temperature. In this experiment, a hot stage (Linkam, THMS600) connected to a central process (Linkam, TMS92), and an image analyzer connected to an optical microscope were used.

(2) Result

The phase behavior of a polyethylene/diluent blend was preferentially confirmed with three diluents for preparing a polyethylene separator, i.e., paraffin oil (Kukdong Oil & Chemicals Co., Ltd., LP350, $M_w$=500~510), dioctyl phthalate (DOP, $M_w$=390), and soybean oil ($T_m$=282° C.).

High density polyethylene (HDPE) powders were blended with each diluent in various compositions and the resulting blend was heated up to 230° C. As a result, a transparent single-phase liquid blend was formed irrelevant to the kind of the used diluent and the composition of the polyethylene/diluent blend. As already known, in all composition, the resulting polyethylene/paraffin oil blend was not phase separated when polyolefin was a liquid state, but was solid-liquid phase separated to form the droplets of the used diluent at a temperature when polyethylene started to convert in the crystal form. Meanwhile, in the case that dioctyl phthalate or soybean oil was used as a diluent, the resulting polyethylene/diluent blend was liquid-liquid phase separated when polyolefin was a liquid state, and then solid-liquid phase separated by small amounts of the remaining diluent at about a crystallization temperature of polyethylene.

Figure 1:
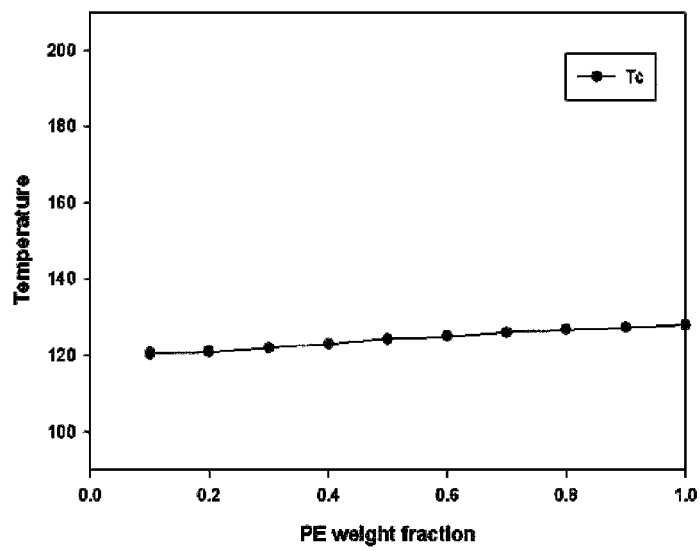
FIG. 1 shows the measurements of a solid-liquid phase separation temperature for polyethylene (PE)/paraffin oil blends depending on the composition thereof.
Figure 2:
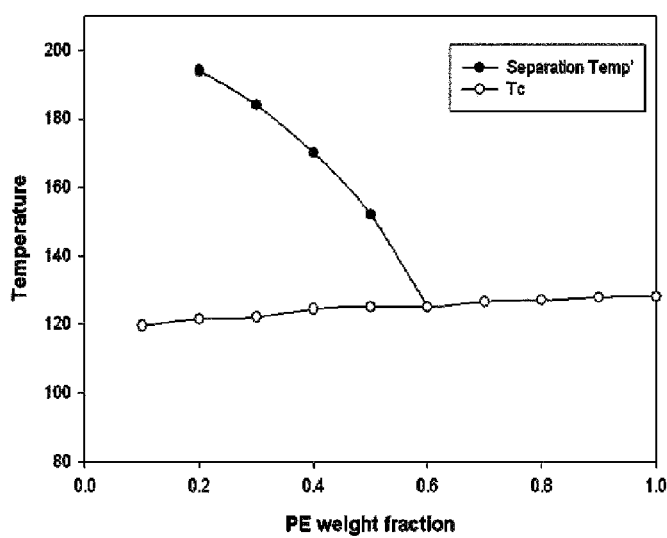
FIG. 2 shows the measurements of liquid-liquid phase separation and solid-liquid phase separation temperatures for polyethylene/dioctyl phthalate blends depending on the composition thereof.

FIGS. 1 and 2 show the measurements of a solid-liquid phase separation temperature for polyethylene (PE)/paraffin oil blends, and the measurements of liquid-liquid phase separation and solid-liquid phase separation temperatures for polyethylene/dioctyl phthalate blends, depending on the composition thereof, respectively.

Figure 3:
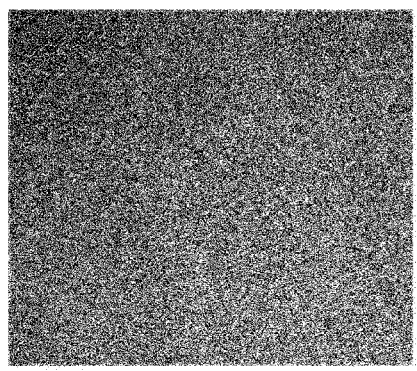
FIG. 3 shows image analysis results observed for the morphological change of a polyethylene/paraffin oil blend before and after the solid-liquid phase separation thereof.
Figure 3:
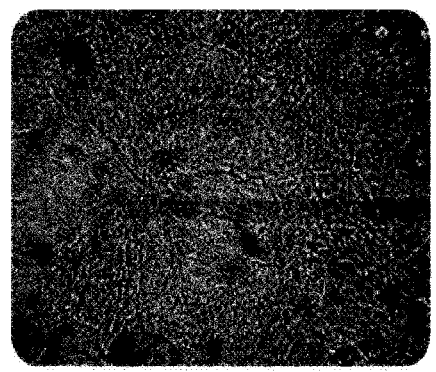
Figure 4:
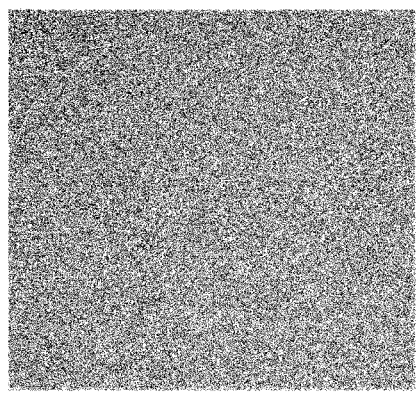
FIG. 4 shows image analysis results observed for the morphological change of a polyethylene/dioctyl phthalate blend before and after the solid-liquid phase separation thereof.
Figure 4:
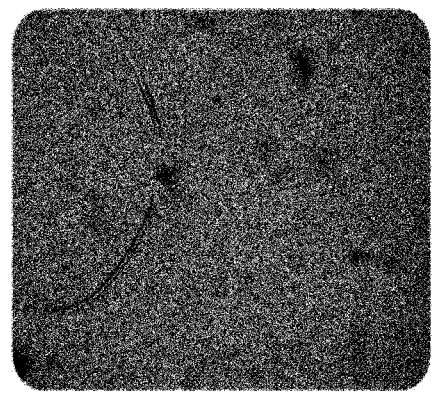

Also, FIG. 3 shows image analysis results observed for the morphological change of the polyethylene/paraffin oil blend before and after the solid-liquid phase separation thereof, and FIG. 4 shows image analysis results observed for the morphological change of a polyethylene/dioctyl phthalate blend before and after the solid-liquid phase separation thereof.

Among these three diluents, the soybean oil-containing blend had the highest liquid-liquid phase separation temperature, thereby allowing the preparation of a separator having the largest pores, the dioctyl phthalate-containing blend allowing the preparation of a separator having the secondarily largest pores, and the paraffin oil-containing blend which forms pores by solid-liquid phase separation allowing the preparation of a separator having the smallest pores.

Preparative Example: Evaluation on Usability of Glycols as a New Diluent (1) Experimental Method For the purpose of developing a new diluent capable of freely controlling the pore size of a polyethylene separator, besides the known diluents (paraffin oil, soybean oil, dioctyl phthalate, etc.) which have been conventionally used in the preparation of a polyethylene separator, various kinds of glycols, i.e., polyethylene glycols (PEG) having various molecular weights ($M_w$=200, 400, 600), polyethylene glycol dimethyl methacrylates (DEGDMA, TEGDMA, PEGDMA, $M_w$=550), and poly(tetramethylene ether) glycols ($M_w$=1,000, 2,000) were confirmed for the formation of a single phase upon using together with polyethylene and the known diluents.

(2) Results

This experiment was carried out to confirm whether glycols has a usability as a new diluent which can be used instead of the known diluents or is miscible with them.

In order for a new substance to use as a diluent alone or in a mixed form, it is necessary to form a single phase with polyethylene and other diluents. In this regard, a mixture of polyethylene/a new diluent (95/5) and a mixture of a known diluent/a new diluent (95/5) were prepared and observed for the formation of a single phase, and the results thereof are shown in Table 1.

failed to form a single-phase mixture at all temperature ranges, however, when they were used with paraffin oil, dioctyl phthalate and soybean oil, mixture having a single phase or two phases were obtained according to the change of temperature and composition.

Thus, since poly(tetramethylene ether) glycols form a single-phase mixture together with several known diluents, it is considered that a mixture of a known diluent/a poly(tetramethylene ether) glycol can be used as a diluent for polyethylene.

Also, when it is intended to use a diluent which does not form a single-phase mixture with polyethylene in all compositions and all temperature ranges, it is considered that such a diluent is blended with small amounts of a poly(tetramethylene ether) glycol in a mixture form, thereby allowing the increase of a phase separation temperature.

Accordingly, hereinafter, phase behaviors for poly(tetramethylene ether) glycol/paraffin oil, poly(tetramethylene ether) glycol/dioctyl phthalate and poly(tetramethylene ether) glycol/soybean oil blends were observed through the following Examples, and the usability thereof as a diluent for polyethylene was reviewed.

EXAMPLES

Preparation and Evaluation of a Composition for Preparing a Separator for an Electrochemical Device Example 1

Figure 5:
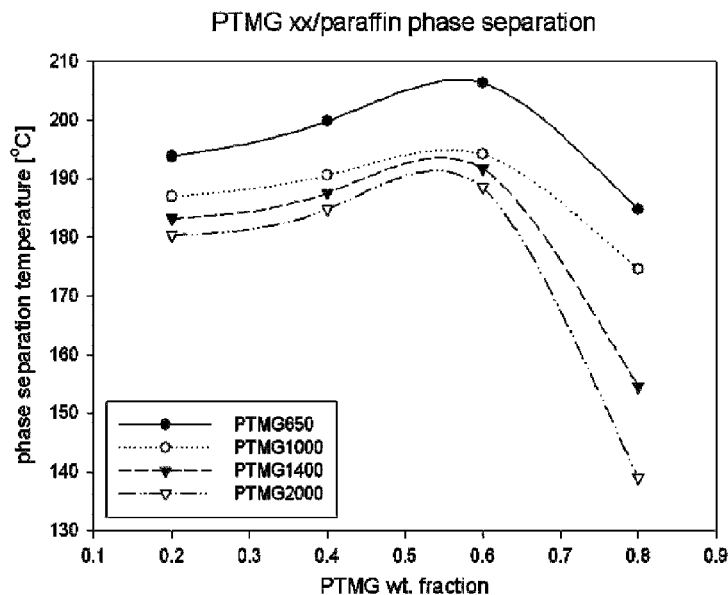
FIG. 5 shows the measurements of a phase separation temperature for paraffin oil/poly(tetramethylene ether) glycol (PTMG) blends depending on the content of PTMG.

Polyethylene//(Paraffin Oil/Poly(Tetramethylene Ether) Glycol) Blend (1) Phase Behavior of Paraffin Oil/Poly(Tetramethylene Ether) Glycol Blend In the paraffin oil/poly(tetramethylene ether) glycol blend, two separated phases were formed, irrelevant to the molecular weight of poly(tetramethylene ether) glycol. However, as can be seen from FIG. 5, in the graph showing the phase transition

TABLE 1

|  | PEG200 | PEG400 | PEG600 | PEGDMA | PTMG1,000 | PTMG2,000 |
|---|---|---|---|---|---|---|
| Polyethylene | IM | IM | IM | IM | IM | IM |
| Paraffin oil | IM | IM | IM | IM | M | M |
| DOP | IM | IM | IM | IM | M | M |
| Soybean oil | IM | IM | IM | IM | M | M |

IM: immiscible mixture
M: miscible mixture

The size of pores formed in polyethylene separators increases as the liquid-liquid phase separation temperature of a polyethylene/diluent mixture increases, and the molecular weight of the used diluent increases. In the case that polyethylene glycols having various molecular weights and polyethylene glycol dimethyl methacrylates (DEGDMA, TEGDMA, PEGDMA) were used as a diluent together with polyethylene or the known diluents such as paraffin oil, dioctyl phthalate and soybean oil, mixtures having two phases were obtained at all temperature ranges.

These results imply that polyethylene glycols having various molecular weights and polyethylene glycol dimethyl methacrylates (DEGDMA, TEGDMA, PEGDMA) cannot be used alone as a diluent for polyethylene and also cannot be used together with the known diluents. In contrast, poly(tetramethylene ether) glycols were used with polyethylene and of the paraffin oil/poly(tetramethylene ether) glycol blend to the molecular weight of poly(tetramethylene ether) glycol, paraffin oil and poly(tetramethylene ether) glycol exhibited upper critical solution temperature (UCST) behaviors for all molecular weights of poly(tetramethylene ether) glycol used. Also, under the condition that the mixing ratio of paraffin oil and poly(tetramethylene ether) glycol is constant, as the molecular weight of poly(tetramethylene ether) glycol increases, single-phase blends were formed at a lower temperature.

Generally, a binary mixture forms a single-phase at a higher temperature as a molecular weight increases in a UCST behavior. However, in the paraffin oil/poly(tetramethylene ether) glycol blend, the opposite phase behavior was observed.

In order to understand the observed phase behavior of the paraffin oil/poly(tetramethylene ether) glycol blend, an interaction energy between paraffin oil and poly(tetramethylene ether) glycol was calculated on the basis of the Flory-Huggins theory. The results calculated from the above theory assuming the observed phase separation temperature as a bimodal point are shown in FIG. 6.

As shown in FIG. 6, the interaction energy has a positive value, and it decreases as the molecular weight of poly(tetramethylene ether) glycol increases. The fact that the interaction energy has a positive value means that the paraffin oil/poly(tetramethylene ether) glycol blend does not form a single phase at room temperature. Also, as interaction energy increases, it is difficult to form a single phase. In order for paraffin oil/poly(tetramethylene ether) glycol blend to form a single phase, its combinatorial entropy which favorably acts on the formation of a single phase should have a value larger than the interaction energy. The combinatorial entropy of the blend increases as the molecular weight of poly(tetramethylene ether) glycol decreases. A decrease in the molecular weight of poly(tetramethylene ether) glycol hinders the formation of a single phase in terms of interaction energy, while facilitating the formation of a single phase in terms of combinatorial entropy. That is, the single phase of the paraffin oil/poly(tetramethylene ether) glycol blend is determined by these two values.

The increase of interaction energy according to the decrease of a molecular weight is considered to be caused by hydroxyl groups present in both ends of poly(tetramethylene ether) glycols. The poly(tetramethylene ether) glycols form hydrogen bonds by hydroxyl groups present in both ends thereof, thereby exhibiting a self-association behavior. In order for the paraffin oil/poly(tetramethylene ether) glycol blend to form a single phase, the self-association of poly(tetramethylene ether) glycol should be broken, and the combination entropy value of the blend should be higher than the interaction energy value thereof. When the molecular weight of poly(tetramethylene ether) glycols decreases, the self-association strength of poly(tetramethylene ether) glycols increases, from which it is difficult to form a single phase together with paraffin oil. That is, in poly(tetramethylene ether) glycols, the ratio of hydroxyl groups and tetramethylene oxide groups within each molecule increases as molecular weight decreases. Accordingly, the paraffin oil/poly(tetramethylene ether) glycol blend is considered to form a single phase at a higher temperature as the molecular weight decreases.

(2) Phase Behavior of Polyethylene//(Paraffin Oil/Poly(Tetramethylene Ether) Glycol) Blend The polyethylene/paraffin oil blend was phase separated at room temperature and became opaque, but formed a transparent single-phase mixture at a crystallization temperature of polyethylene or higher. In the polyethylene/paraffin oil blend, liquid-liquid phase separation was not observed, but solid-liquid phase separation was observed at about a crystallization temperature of polyethylene. Meanwhile, the polyethylene/poly(tetramethylene ether) glycol blend formed a mixture having two phases at all temperature ranges. Therefore, poly(tetramethylene ether) glycol is difficult to be used alone as a diluent. However, the addition of paraffin oil to the polyethylene/poly(tetramethylene ether) glycol blend resulted in the formation of a single phase at a high temperature.

Figure 7:
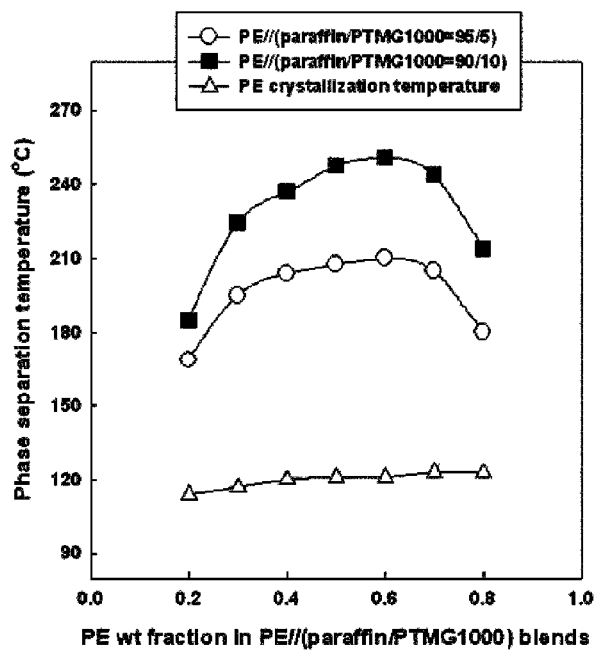
FIG. 7 shows the measurements of a phase separation temperature for polyethylene//(paraffin oil/poly(tetramethylene ether) glycol (1,000) blends depending on the mixing ratio thereof.

FIG. 7 shows phase separation behaviors for polyethylene//(paraffin oil/poly(tetramethylene ether) glycol (1,000)) blends depending on the mixing ratio thereof.

The phase separation temperature for polyethylene//(paraffin oil/poly(tetramethylene ether) glycol (1,000) blend increased as the content of polyethylene increased, and then decreased when the content of polyethylene reached about 60%.

Under the condition that the content of polyethylene was fixed in the paraffin oil/poly(tetramethylene ether) glycol (1,000) blend, the phase separation temperature of the blend increased as the content of poly(tetramethylene ether) glycol in the blend increased. The crystallization temperature slowly increased as the content of polyethylene in the polyethylene//(paraffin oil/poly(tetramethylene ether) glycol (1,000)) blend increased, while it was almost constant, irrelevant to the mixing ratio of paraffin oil and poly(tetramethylene ether) glycol, under the same content of polyethylene. Such a result was also obtained in the use of poly(tetramethylene ether) glycol having different molecular weights.

Figure 8:
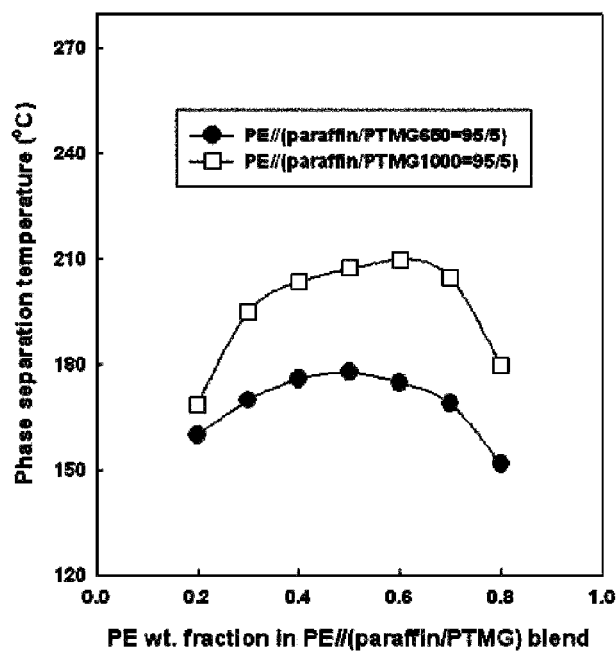
FIG. 8 shows the measurements of a phase separation temperature for polyethylene//(paraffin oil/poly(tetramethylene ether) glycol (PTMG) (1,000) blends obtained by varying the weight average molecular weight of PTMG.

FIG. 8 shows the measurements of a phase separation temperature for polyethylene//(paraffin oil/poly(tetramethylene ether) glycol (1,000) blends obtained by varying the weight average molecular weight of poly(tetramethylene ether) glycol. Under the condition that the mixing ratio of paraffin oil/poly(tetramethylene ether) glycol was constant, the phase separation temperature of the blend increased as the molecular weight of poly(tetramethylene ether) glycol increased.

Figure 9:
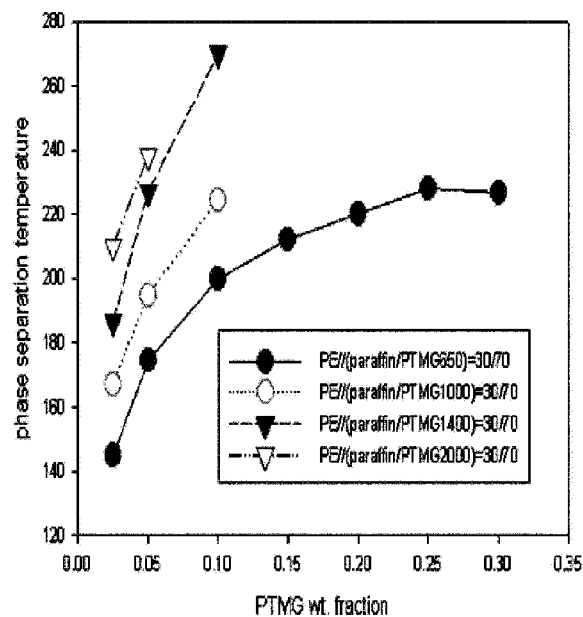
FIG. 9 shows the measurements of a phase separation temperature for blends of polyethylene//(paraffin oil/poly(tetramethylene ether) glycol (PTMG)=30//70 depending on the content of PTMG.

In order to confirm the effect of the mixing ratio of paraffin oil/poly(tetramethylene ether) glycol and the molecular weight change of poly(tetramethylene ether) glycol on the phase separation temperature of the polyethylene//(paraffin oil/poly(tetramethylene ether) glycol blend, polyethylene/diluents (30/70) blends, which have been conventionally used in the preparation of a polyethylene separator, were prepared and examined, and the results thereof are shown in FIG. 9.

As shown in FIG. 9, the phase separation temperatures were observed up to about 270° C. since paraffin oil evaporated at about 270° C.

In the blend of polyethylene//(paraffin oil/poly(tetramethylene ether) glycol (650))=30//70, a single phase was formed when the content of poly(tetramethylene ether) glycol (650) in the paraffin oil/poly(tetramethylene ether) glycol (650) mixture was 30 wt % or less, while two phases were formed when exceeding such content. The higher molecular weight of poly(tetramethylene ether) glycol was used, the smaller amount of poly(tetramethylene ether) glycol was comprised in the paraffin oil/poly(tetramethylene ether) glycol blend. Therefore, a single phase was formed when poly(tetramethylene ether) glycol (1,000) and poly(tetramethylene ether) glycol (1,400) were each used in an amount of 10 wt % or less, and poly(tetramethylene ether) glycol (2,000) was used in an amount of 5 wt % or less.

Thus, the phase separation temperature of polyethylene//(paraffin oil/poly(tetramethylene ether) glycol) blends increased as the content of poly(tetramethylene ether) glycol increased, or the molecular weight of poly(tetramethylene ether) glycol increased. In the case that the mixing ratio of paraffin oil/poly(tetramethylene ether) glycol was constant, the phase separation temperature of paraffin oil/poly(tetramethylene ether) glycol was always lower than the phase separation temperature of the polyethylene//(paraffin oil/poly(tetramethylene ether) glycol) blend. Since polyethylene and paraffin oil have the same repeating units, the polyethylene/poly(tetramethylene ether) glycol blend will be assumed to have the same interaction energy as paraffin oil/poly(tetramethylene ether) glycol. That is, it can be considered that the paraffin oil/poly(tetramethylene ether) glycol blend and the polyethylene//(paraffin oil/poly(tetramethylene ether) glycol) blend have the same interaction energy. However, because the molecular weight of polyethylene is very high as compared with paraffin oil, combinatorial entropy which is favorable to the formation of a single phase is significantly reduced. This is considered as the reason that the phase separation temperature of paraffin oil/poly(tetramethylene ether) glycol was always lower than the phase separation temperature of the polyethylene//(paraffin oil/poly(tetramethylene ether) glycol) blend.

Also, the phase separation temperature of the paraffin oil/poly(tetramethylene ether) glycol blend increased as the molecular weight of poly(tetramethylene ether) glycol decreased, while the phase separation temperature of the polyethylene//(paraffin oil/poly(tetramethylene ether) glycol) blend was observed to have the opposite results. This can also be explained by the self-association of poly(tetramethylene ether) glycol. Because the phase separation temperature of the paraffin oil/poly(tetramethylene ether) blend is always lower than the phase separation temperature of the glycol polyethylene//(paraffin oil/poly(tetramethylene ether) glycol) blend, the paraffin oil/poly(tetramethylene ether) glycol blend always forms a single phase at about the phase separation temperature of the polyethylene//(paraffin oil/poly(tetramethylene ether) glycol) blend. This means that the self-association of poly(tetramethylene ether) glycol is absent at about the phase separation temperature of the polyethylene//(paraffin oil/poly(tetramethylene ether) glycol) blend. That is, the self-association of poly(tetramethylene ether) glycol does not affect the phase behavior of the polyethylene//(paraffin oil/poly(tetramethylene ether) glycol) blend at about the phase separation temperature of the polyethylene//(paraffin oil/poly(tetramethylene ether) glycol) blend, and the phase separation temperature is determined by the molecular weight of each component comprised in the polyethylene//(paraffin oil/poly(tetramethylene ether) glycol) blend. Accordingly, in polyethylene//(paraffin oil/poly(tetramethylene ether) glycol) blends having the same composition, the lower molecular weight of each component lowers the temperature at which a single phase is formed.

Thus, the phase separation temperature of a polyethylene//(paraffin oil/poly(tetramethylene ether) glycol) blend can be controlled by adjusting the content or molecular weight of poly(tetramethylene ether) glycol in the paraffin oil/poly(tetramethylene ether) glycol blend.

(3) Evaluation on Morphology Change of Polyethylene//(Paraffin Oil/Poly(Tetramethylene Ether)Glycol) Blend Generally, in blends of polyethylene/a diluent, at the higher phase separation temperature, the larger droplets are formed by phase separation. In order to confirm this, a polyethylene//(paraffin oil/poly(tetramethylene ether) glycol) blend was phase separated to form droplets, and the droplets was observed for their size change depending on the phase separation temperature.

Also, in order to observe the morphology change of droplets formed by phase separation, a polyethylene//(paraffin oil/poly(tetramethylene ether) glycol) blend was heated to their phase separation temperature or higher to obtain a single-phase blend, and cooled at a rate of 10° C./min. When a temperature reached 140° C., the morphology change of the blend was observed. Also, the structure of pores formed in a polyethylene matrix was observed by using an FE-SEM. Specifically, in order to observe the structure of pores, a single-phase blend of polyethylene//(paraffin oil/poly(tetramethylene ether) glycol) was cooled at a rate of 10° C./min to a crystallization temperature of polyethylene, immobilized in liquid nitrogen, and observed for its cross-section structure by using an FE-SEM.

Figure 10:
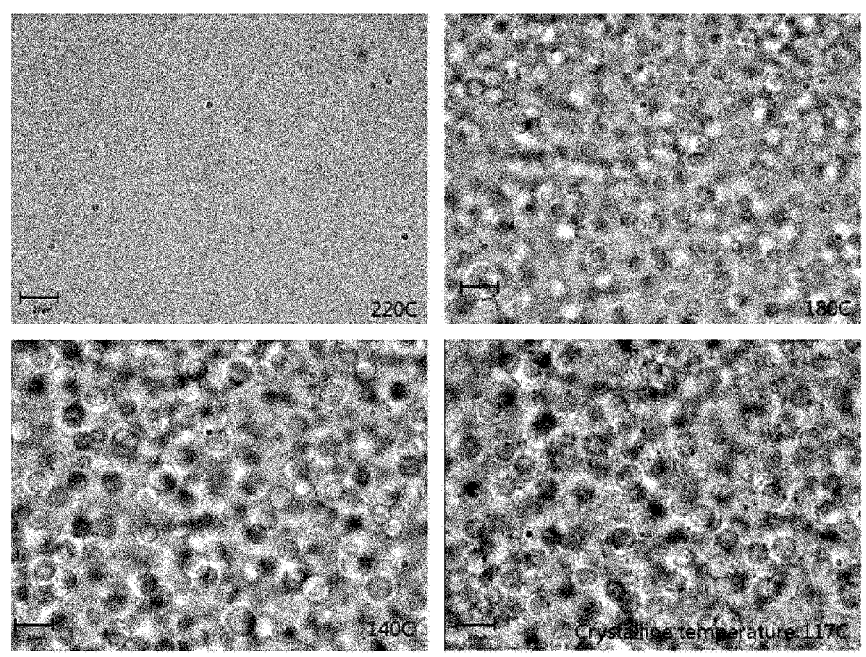
FIG. 10 shows the size and morphology of the droplets of a blend of polyethylene//(paraffin oil/poly(tetramethylene ether) glycol (1,000)=90/10)=30//70 depending on the cooling temperature of the blend.

FIG. 10 shows morphology changes depending on a cooling temperature in the droplets formed by cooling a blend of polyethylene//(paraffin oil/poly(tetramethylene ether) glycol (1,000)=90/10)=30//70 at a rate of 10° C./min As shown in FIG. 10, when the blend of polyethylene//(paraffin oil/poly(tetramethylene ether) glycol (1,000)=90/10)=30//70 was cooled to its phase separation temperature (227° C.), it was separated to liquid-liquid phases to form droplets.

The growth of droplets was progressed as the temperature was gradually reduced by cooling. When the temperature reached at a crystallization temperature (117° C.) of polyethylene, the crystals of polyethylene were formed, and relatively small droplets were observed to be formed by solid-liquid phase separation.

Thus, from the polyethylene//(paraffin oil/poly(tetramethylene ether) glycol) blend, different droplets were formed by two different phase separation mechanisms. That is, large droplets were observed to be formed by liquid-liquid phase separation, while small droplets were formed by solid-liquid phase separation.

Figure 11:
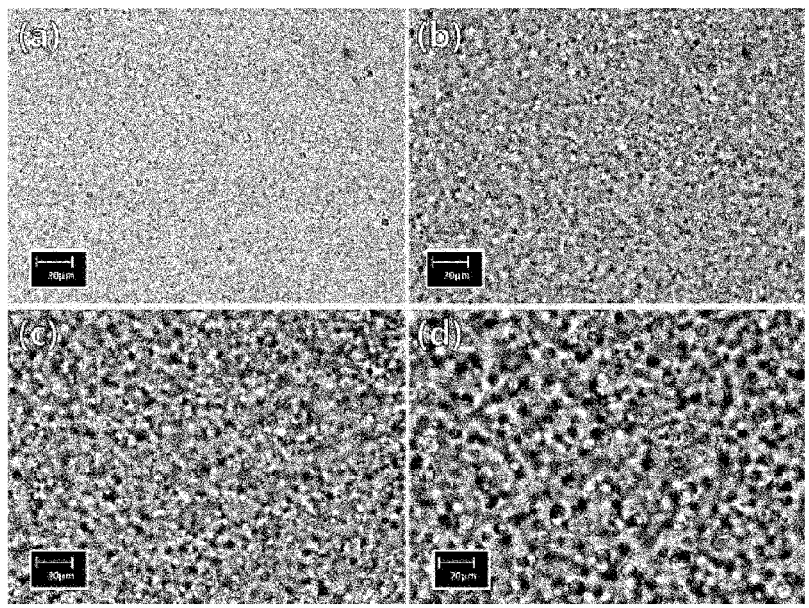
FIG. 11 shows the size and morphology of the droplets of each of (a) a blend of polyethylene//(paraffin oil/poly(tetramethylene ether) glycol (650)=97.5/2.5)=30//70, (b) a blend of polyethylene//(paraffin oil/poly(tetramethylene ether) glycol (650)=95/5)=30//70, (c) a blend of polyethylene//(paraffin oil/poly(tetramethylene ether) glycol (650)=90/10)=30//70, and (d) a blend of polyethylene//(paraffin oil/poly(tetramethylene ether) glycol (650)=85/15)=30//70.

FIG. 11 shows the size change of droplets depending on the mixing ratio in blends of polyethylene//(paraffin oil/poly(tetramethylene ether) glycol (650))=30//70. In paraffin oil/poly(tetramethylene ether) glycol (650), since more poly(tetramethylene ether) glycol resulted in the higher phase separation temperature, larger droplets were formed at 140° C.

Figure 12:
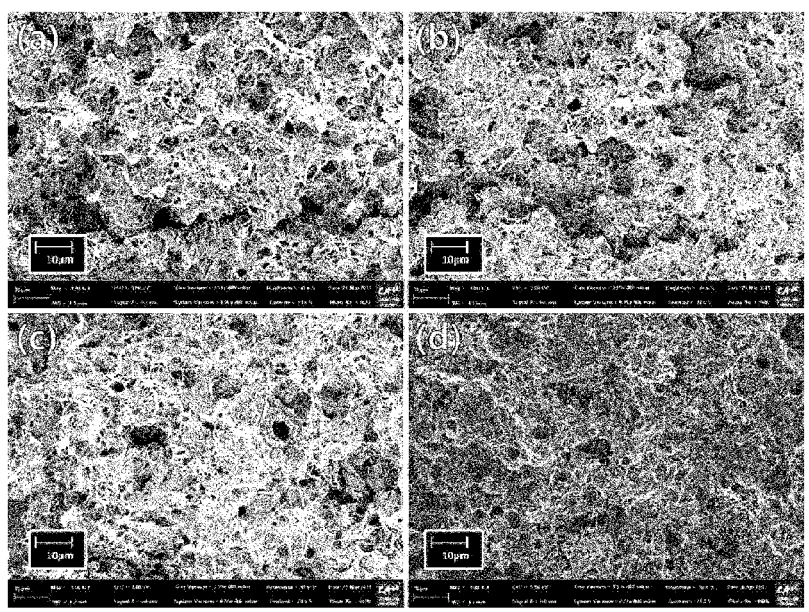
FIG. 12 shows the structure of pores present in each polyethylene matrix after each of the following blends is cooled to a temperature less than or equivalent to a crystallization temperature of polyethylene: (a) a blend of polyethylene//(paraffin oil/poly(tetramethylene ether) glycol (650)=97.5/2.5)=30//70, (b) a blend of polyethylene//(paraffin oil/poly(tetramethylene ether) glycol (650)=95/5)=30//70, (c) a blend of polyethylene//(paraffin oil/poly(tetramethylene ether) glycol (650)=90/10)=30//70, and (d) a blend of polyethylene//(paraffin oil/poly(tetramethylene ether) glycol (650)=85/15)=30//70.

FIG. 12 shows the structure of pores present in each polyethylene matrix after each of the following blends was cooled to a temperature less than or equivalent to a crystallization temperature of polyethylene: (a) a blend of polyethylene//(paraffin oil/poly(tetramethylene ether) glycol (650)=97.5/2.5)=30//70, (b) a blend of polyethylene//(paraffin oil/poly(tetramethylene ether) glycol (650)=95/5)=30//70, (c) a blend of polyethylene//(paraffin oil/poly(tetramethylene ether) glycol (650)=90/10)=30//70, and (d) a blend of polyethylene//(paraffin oil/poly(tetramethylene ether) glycol (650)=85/15)=30//70.

As can be seen from FE-SEM images, large pores and small pores around them were present, the large pores on the images corresponding to the sites of droplets formed by liquid-liquid phase separation, and the small pores being generated as paraffin oil is emitted by activation energy difference induced on the crystallization of polyethylene. The size of droplets formed by liquid-liquid phase separation increased as the content of poly(tetramethylene ether) glycol increased in paraffin oil/poly(tetramethylene ether) glycol (650).

Figure 13:
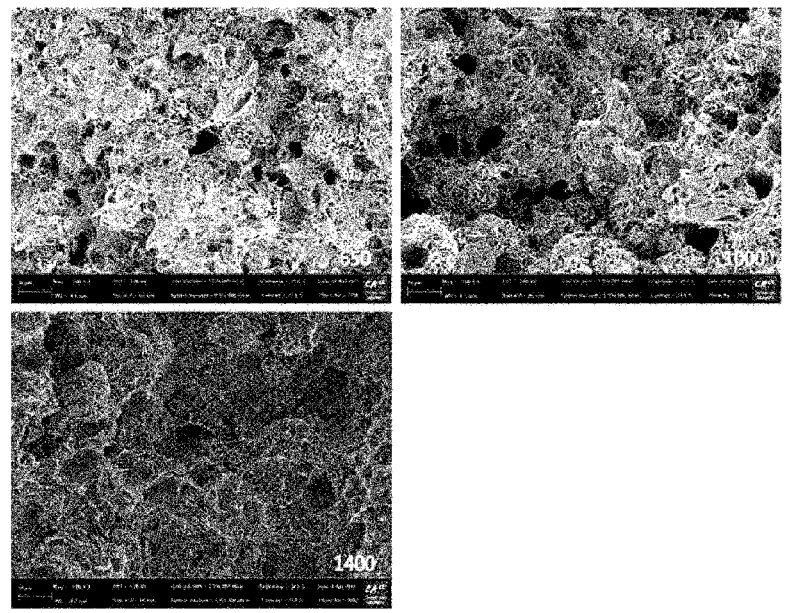
FIG. 13 shows SEM images for the structure of pores present in each polyethylene matrix after each of the following blends is cooled to a temperature less than or equivalent to a crystallization temperature of polyethylene: a blend of polyethylene//(paraffin oil/poly(tetramethylene ether) glycol (650)=90/10)=30//70; a blend of polyethylene//(paraffin oil/poly(tetramethylene ether) glycol (1,000)=90/10)=30//70; and a blend of polyethylene//(paraffin oil/poly(tetramethylene ether) glycol (1,400)=90/10)=30//70.

FIG. 13 shows SEM images for the structure of pores present in each polyethylene matrix after each of the following blends is cooled to a temperature less than or equivalent to the crystallization temperature of polyethylene: a blend of polyethylene//(paraffin oil/poly(tetramethylene ether) glycol (650)=90/10)=30//70; a blend of polyethylene//(paraffin oil/poly(tetramethylene ether) glycol (1,000)=90/10)=30//70; and a blend of polyethylene//(paraffin oil/poly(tetramethylene ether) glycol (1,400)=90/10)=30//70.

The size of pores present in each polyethylene matrix was observed to gradually increase as the molecular weight of poly(tetramethylene ether) glycol increased. Accordingly, when a polyethylene//(paraffin oil/poly(tetramethylene ether) glycol) blend has an increased phase separation temperature, i.e., the content or molecular weight of poly(tetramethylene ether) glycol therein increases, a separator having large pores can be obtained from such a polyethylene//(paraffin oil/poly(tetramethylene ether) glycol) blend.

Figure 14:
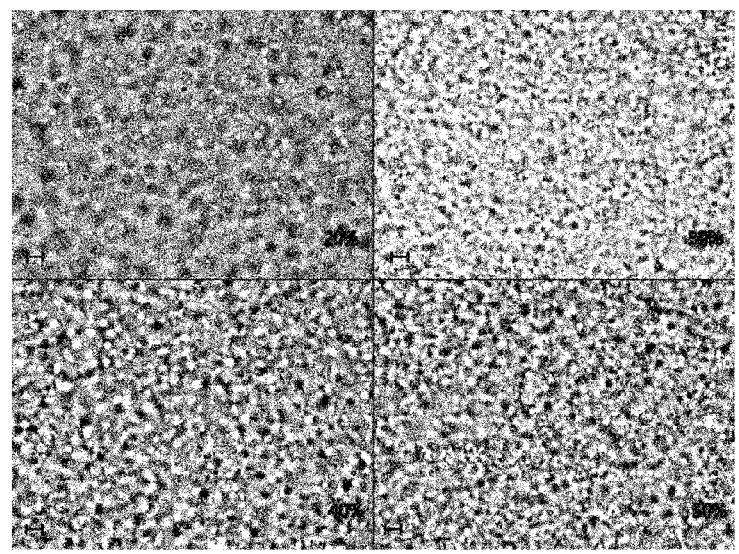
FIG. 14 shows the size and morphology of the droplets of each blend of polyethylene//(paraffin oil/poly(tetramethylene ether) glycol (650)=90/10) depending on the content of polyethylene.

FIG. 14 shows the size and morphology of the droplets of each blend of polyethylene//(paraffin oil/poly(tetramethylene ether) glycol (650)=90/10) depending on the content of polyethylene.

As shown in FIG. 14, large droplets were formed when the content of paraffin oil/poly(tetramethylene ether) glycol blend increased. This is because the more droplets per unit volume are formed during phase separation, the more content of diluents are used, and then the formed droplets rapidly grow by a coarsening process such as Oswald ripening process and coalescence process.

Thus, the phase separation temperature of polyethylene//(paraffin oil/poly(tetramethylene ether) glycol) blend can be controlled from a crystallization temperature of polyethylene to an evaporation temperature of paraffin oil (about 270° C.) by adjusting the content of paraffin oil/poly(tetramethylene ether) glycol or the molecular weight of poly(tetramethylene ether) glycol, thereby controlling the size of pores formed in a separator from about 0.2 to 25 μm.

Example 2

Figure 15:
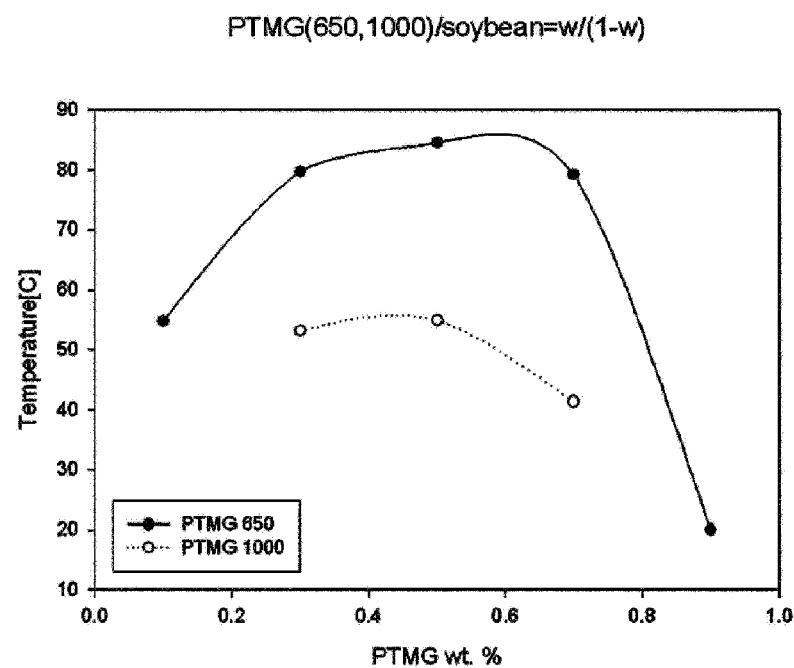
FIG. 15 shows the measurements of a phase separation temperature for poly(tetramethylene ether) glycol (PTMG)/soybean oil blends depending on the content of PTMG.

Polyethylene//(Soybean Oil/Poly(Tetramethylene Ether) Glycol) Blend (1) Phase Behavior of Soybean Oil/Poly(Tetramethylene Ether) Glycol Blend FIG. 15 shows the measurements of a phase separation temperature for poly(tetramethylene ether) glycol/soybean oil blends depending on the content of poly(tetramethylene ether) glycol.

As shown in FIG. 15, the soybean oil/poly(tetramethylene ether) glycol blends exhibited an upper critical solution temperature behavior similar to the paraffin oil/poly(tetramethylene ether) glycol blends, and poly(tetramethylene ether) glycol having a high molecular weight resulted in phase separation at a lower temperature as compared with that having a low molecular weight.

Figure 16:
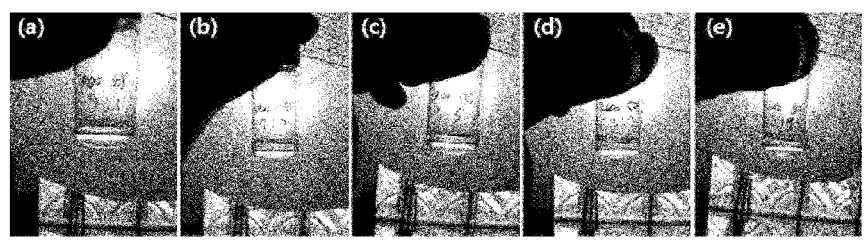
FIG. 16 shows the blending procedure carried out at room temperature for each of (a) poly(tetramethylene ether) glycol (2,000)/soybean oil=90/10, (b) poly(tetramethylene ether) glycol (2,000)/soybean oil=70/30, (c) poly(tetramethylene ether) glycol (2,000)/soybean oil=50/50, (d) poly(tetramethylene ether) glycol (2,000)/soybean oil=30/70, and (e) poly(tetramethylene ether) glycol (2,000)/soybean oil=10/90.

FIG. 16 shows the blending procedure carried out at room temperature for each of (a) poly(tetramethylene ether) glycol (2,000)/soybean oil=90/10, (b) poly(tetramethylene ether) glycol (2,000)/soybean oil=70/30, (c) poly(tetramethylene ether) glycol (2,000)/soybean oil=50/50, (d) poly(tetramethylene ether) glycol (2,000)/soybean oil=30/70, and (e) poly(tetramethylene ether) glycol (2,000)/soybean oil=10/90.

As shown in FIG. 16, the poly(tetramethylene ether) glycols whose molecular weight are 1,400 and 2,000, respectively exhibited to form a single-phase mixture at room temperature.

Thus, in the case of a soybean oil/poly(tetramethylene ether) glycol blend, it is difficult to be a single-phase mixture when the molecular weight of poly(tetramethylene ether) glycols becomes lower. This phenomenon is considered to be caused by the self-association of poly(tetramethylene ether) glycols.

Also, when a certain molecular weight of poly(tetramethylene ether) glycol is blended with paraffin oil or soybean oil, the soybean oil/poly(tetramethylene ether) glycol blend forms a single phase at a lower temperature as compared with the paraffin oil/poly(tetramethylene ether) glycol blend. This is considered because paraffin oil consisting of non-polar repeating units is not subject to specific interaction with polar poly(tetramethylene ether) glycols, whereas soybean oil comprising a polar group is subject to specific interaction with poly(tetramethylene ether) glycols.

Figure 17:
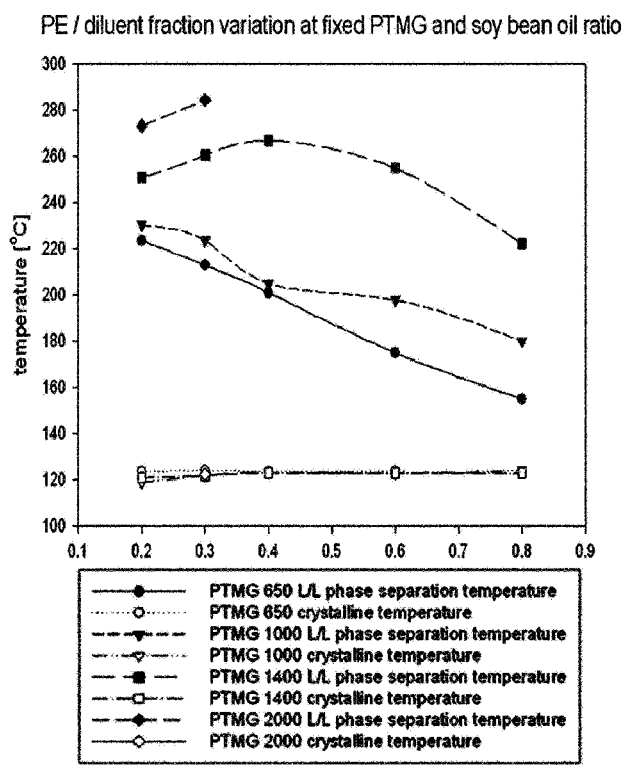
FIG. 17 shows the measurements of a phase separation temperature for blends of polyethylene//(soybean oil/poly(tetramethylene ether) glycol=95/5) depending on the content of polyethylene.

(2) Phase Behavior of Polyethylene//(Soybean Oil/Poly(Tetramethylene Ether) Glycol) Blend FIG. 17 shows the measurements of a phase separation temperature for blends of polyethylene//(soybean oil/poly(tetramethylene ether) glycol=95/5) depending on the content of polyethylene.

In the case of polyethylene//(soybean oil/poly(tetramethylene ether) glycol=95/5) blends, a single phase is always formed at a high temperature irrelevant to the molecular weight of poly(tetramethylene ether) glycol, unlike polyethylene/soybean oil blends. Also, when the composition of polyethylene//(soybean oil/poly(tetramethylene ether) glycol=95/5) blends is fixed, the higher molecular weight poly(tetramethylene ether) glycols have, the higher phase separation temperature was observed. In the case of poly(tetramethylene ether) glycol whose molecular weight is 650 and poly(tetramethylene ether) glycol whose molecular weight is 1,000, the more polyethylene resulted in the less phase separation temperature, whereas in the case of poly(tetramethylene ether) glycol whose molecular weight is 1,400, its phase separation temperature increased as the content of polyethylene increased, and then decreased when the content of polyethylene reached about 40%.

For the understanding of this phase behavior, quantitative analysis based on thermodynamics is required. Meanwhile, it is considered that the crystallization temperature of polyethylene increases as the content of polyethylene increases, but is not substantially affected by the molecular weight of poly(tetramethylene ether) glycol.

Figure 18:
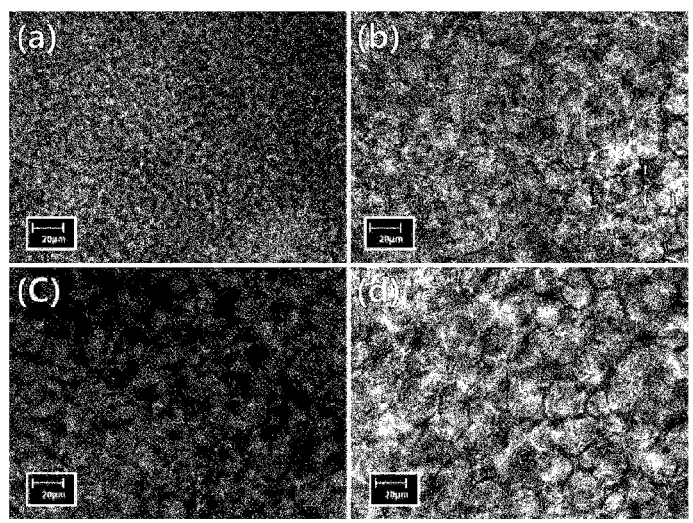
FIG. 18 shows the structure of droplets for each of the following blends, observed at a crystallization temperature of polyethylene while each blend is cooled in a single-phase: (a) a blend of polyethylene//(poly(tetramethylene ether) glycol (650)/soybean oil=5/95)=30//70, (b) a blend of polyethylene//(poly(tetramethylene ether) glycol (1,000)/soybean oil=5/95)=30//70, (c) a blend of polyethylene//(poly(tetramethylene ether) glycol (1,400)/soybean oil=5/95)=30//70, and (d) a blend of polyethylene//(poly(tetramethylene ether) glycol (2,000)/soybean oil=5/95)=30//70.
Figure 19:
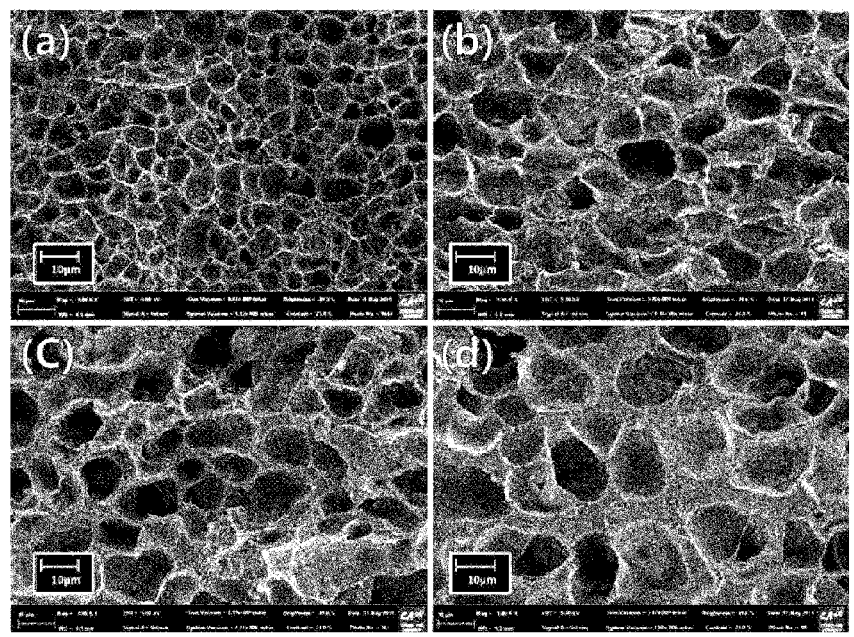
FIG. 19 shows SEM images for the structure of pores present in each polyethylene matrix after each of the following blends is cooled to a temperature less than or equivalent to a crystallization temperature of polyethylene: (a) a blend of polyethylene//(poly(tetramethylene ether) glycol (650)/soybean oil=5/95)=30//70, (b) a blend of polyethylene//(poly(tetramethylene ether) glycol (1,000)/soybean oil=5/95)=30//70, (c) a blend of polyethylene//(poly(tetramethylene ether) glycol (1,400)/soybean oil=5/95)=30//70, and (d) a blend of polyethylene//(poly(tetramethylene ether) glycol (2,000)/soybean oil=5/95)=30//70.

(3) Evaluation on Morphology Change of Polyethylene//(Soybean Oil/Poly(Tetramethylene Ether) Glycol) Blend FIG. 18 shows the structure of droplets for each of the following blends, observed at the crystallization temperature of polyethylene while each blend is cooled in a single-phase: (a) a blend of polyethylene//(poly(tetramethylene ether) glycol (650)/soybean oil=5/95)=30//70, (b) a blend of polyethylene//(poly(tetramethylene ether) glycol (1,000)/soybean oil=5/95)=30//70, (c) a blend of polyethylene//(poly(tetramethylene ether) glycol (1,400)/soybean oil=5/95)=30//70, and (d) a blend of polyethylene//(poly(tetramethylene ether) glycol (2,000)/soybean oil=5/95)=30//70, and FIG. 19 shows SEM photographs for the structure of pores present in each polyethylene matrix after the cooling of each of the following blends is carried out to a temperature less than or equivalent to the crystallization temperature of polyethylene: (a) a blend of polyethylene//(poly(tetramethylene ether) glycol (650)/soybean oil=5/95)=30//70, (b) a blend of polyethylene//(poly(tetramethylene ether) glycol (1,000)/soybean oil=5/95)=30//70, (c) a blend of polyethylene//(poly(tetramethylene ether) glycol (1,400)/soybean oil=5/95)=30//70, and (d) a blend of polyethylene//(poly(tetramethylene ether) glycol (2,000)/soybean oil=5/95)=30//70.

As shown in FIGS. 18 and 19, the higher molecular weight of poly(tetramethylene ether) glycols resulted in the higher phase separation temperature, from which a time for the growth of droplets increases to form large droplets.

Figure 20:
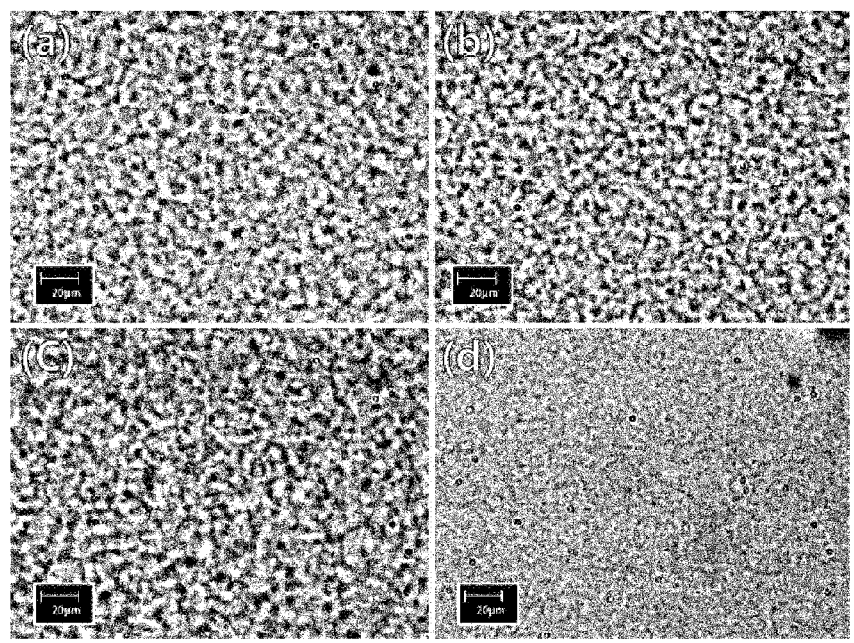
FIG. 20 shows the size and morphology of droplets for each of the following blends: (a) a blend of polyethylene//(poly(tetramethylene ether) glycol (650)/soybean oil=5/95)=20//80, (b) a blend of polyethylene//(poly(tetramethylene ether) glycol (650)/soybean oil=5/95)=30//70, (c) a blend of polyethylene//(poly(tetramethylene ether) glycol (650)/soybean oil=5/95)=40//60, and (d) a blend of polyethylene//(poly(tetramethylene ether) glycol (650)/soybean oil=5/95)=60//40.
Figure 21:
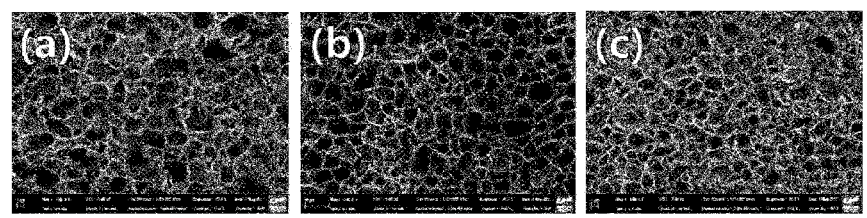
FIG. 21 shows SEM images for the structure of pores present in each polyethylene matrix after each of the following blends is cooled to a temperature less than or equivalent to a crystallization temperature of polyethylene: (a) a blend of polyethylene//(poly(tetramethylene ether) glycol (650)/soybean oil=5/95)=20//80, (b) a blend of polyethylene//(poly(tetramethylene ether) glycol (650)/soybean oil=5/95)=30//70, and (c) a blend of polyethylene//(poly(tetramethylene ether) glycol (650)/soybean oil=5/95)=40//60.

FIGS. 20 and 21 show the size and morphology of droplets obtained from polyethylene//(soybean oil/poly(tetramethylene ether) glycol(650)=95/5) blends depending on the content of polyethylene, and SEM photographs for the structure of pores present in each polyethylene matrix after the cooling of each blend is carried out to a temperature less than or equivalent to the crystallization temperature of polyethylene, respectively.

From FIGS. 20 and 21, it can be seen that the pore size decreased as the content of soybean oil/poly(tetramethylene ether) glycol blend decreased.

Figure 22:
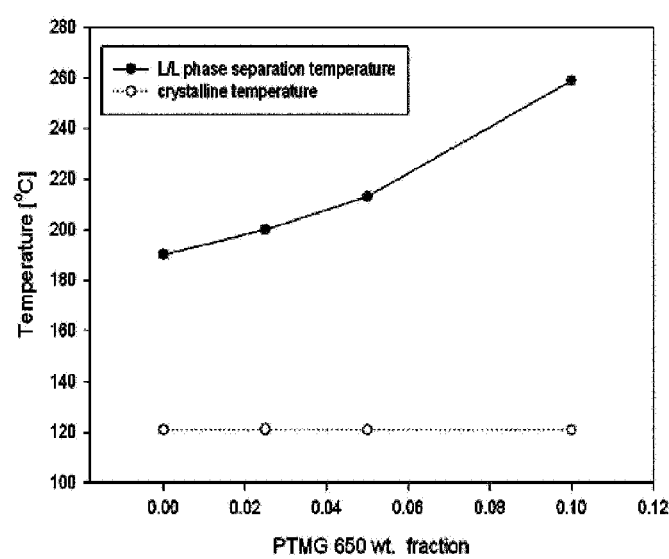
FIG. 22 shows the measurements of a phase separation temperature for blends of polyethylene//(soybean oil/poly(tetramethylene ether) glycol (PTMG) (650)=30/70) depending on the content of PTMG.

FIG. 22 shows the measurements of a phase separation temperature for polyethylene//(soybean oil/poly(tetramethylene ether) glycol (650)=30/70) blends depending on the content of poly(tetramethylene ether) glycol.

In the case of soybean oil/poly(tetramethylene ether) glycol(650) blends, the more the poly(tetramethylene ether) glycol resulted, the higher the phase separation temperature. Also, in the case that the content of polyethylene was constant in polyethylene//(soybean oil/poly(tetramethylene ether) glycol blends, even though the composition of soybean oil/poly(tetramethylene ether) glycol blend was varied, the crystallization temperature of polyethylene barely changed.

Figure 23:
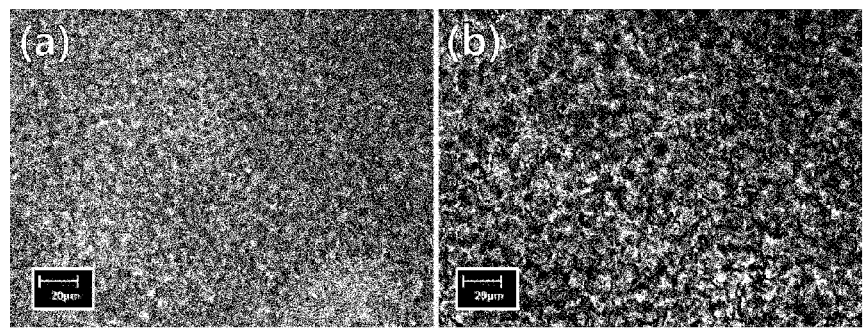
FIG. 23 shows the structure of droplets for each of the following blends, observed at a crystallization temperature of polyethylene while each blend is cooled in a single-phase: (a) a blend of polyethylene//(poly(tetramethylene ether) glycol (650)/soybean oil=2.5/97.5)=30//70, and (b) a blend of polyethylene//(poly(tetramethylene ether) glycol (650)/soybean oil=5/95)=30//70.
Figure 24:
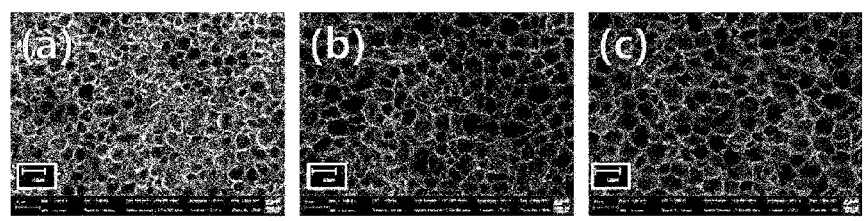
FIG. 24 shows SEM images for the structure of pores present in each polyethylene matrix after each of the following blends is cooled to a temperature less than or equivalent to a crystallization temperature of polyethylene: (a) a blend of polyethylene//(poly(tetramethylene ether) glycol (650)/soybean oil=2.5/97.5)=30//70, (b) a blend of polyethylene//(poly(tetramethylene ether) glycol (650)/soybean oil=5/95)=30//70, and (c) a blend of polyethylene//(poly(tetramethylene ether) glycol (650)/soybean oil=10/90)=30//70.

Also, FIGS. 23 and 24 show that the size of pores or droplets increased as the content of poly(tetramethylene ether) glycol increased in soybean oil/poly(tetramethylene ether) glycol(650) blends.

Thus, the phase separation temperature of polyethylene//(soybean oil/poly(tetramethylene ether) glycol) blends can also be controlled by adjusting the content or molecular weight of poly(tetramethylene ether) glycols, similar to polyethylene//(paraffin oil/poly(tetramethylene ether) glycol) blends, from which the size of pores formed in a polyethylene separator can be controlled.

Example 3

Figure 25:
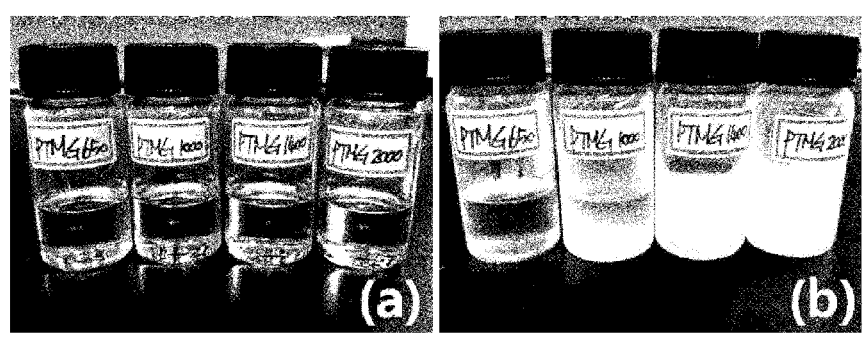
FIG. 25 shows photographs for solutions (a) obtained by mixing poly(tetramethylene ether) glycol (PTMG) and dioctyl phthalate in a mixing ratio of 50/50 at 25° C. with varying the molecular weight of the used PTMG, and solutions (b) by mixing poly(tetramethylene ether) glycol (PTMG) and dioctyl phthalate in a mixing ratio of 50/50 at 0° C. with varying the molecular weight of the used PTMG.

Polyethylene//(Dioctyl Phthalate/Poly(Tetramethylene Ether) Glycol) Blend (1) Phase Behavior of Dioctyl Phthalate/Poly(Tetramethylene Ether) Glycol Blend FIG. 25 shows photographs for solutions (a) obtained by mixing poly(tetramethylene ether) glycol and dioctyl phthalate in a mixing ratio of 50/50 at 25° C. with varying the molecular weight of the used poly(tetramethylene ether) glycol, and solutions (b) by mixing poly(tetramethylene ether) glycol and dioctyl phthalate in a mixing ratio of 50/50 at 0° C. with varying the molecular weight of the used poly(tetramethylene ether) glycol.

As shown in FIG. 25, dioctyl phthalate/poly(tetramethylene ether) glycol blends formed a single phase at room temperature irrelevant to the molecular weight of poly(tetramethylene ether) glycol and the blending ratio, but was phase separated when cooling to 0° C.

Upon comparing the compatibility of diluents with each other from the above experimental results, the best compatibility was exhibited in poly(tetramethylene ether) glycol/dioctyl phthalate, the next in poly(tetramethylene ether) glycol/soybean oil, and then poly(tetramethylene ether) glycol/paraffin oil. Also, the compatibility of diluents with polyethylene was in order of polyethylene/paraffin oil (the best), polyethylene/dioctyl phthalate, polyethylene/soybean oil, and polyethylene/poly(tetramethylene ether) glycol blend.

That is, it can be confirmed that polyethylene or paraffin oil whose repeating units are non-polar exhibits good compatibility when blending with diluents having a weak polarity.

(2) Phase Behavior of Polyethylene//(Dioctyl Phthalate/Poly (Tetramethylene Ether) Glycol) Blend and Evaluation Thereof.

Figure 26:
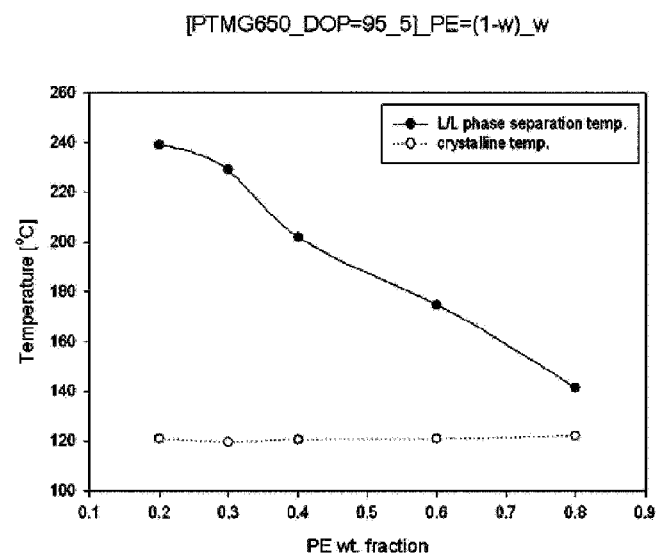
FIG. 26 shows the measurements of a phase separation temperature for blends of polyethylene//(dioctyl phthalate/poly(tetramethylene ether) glycol(650)=95/5) depending on the content of polyethylene.
Figure 27:
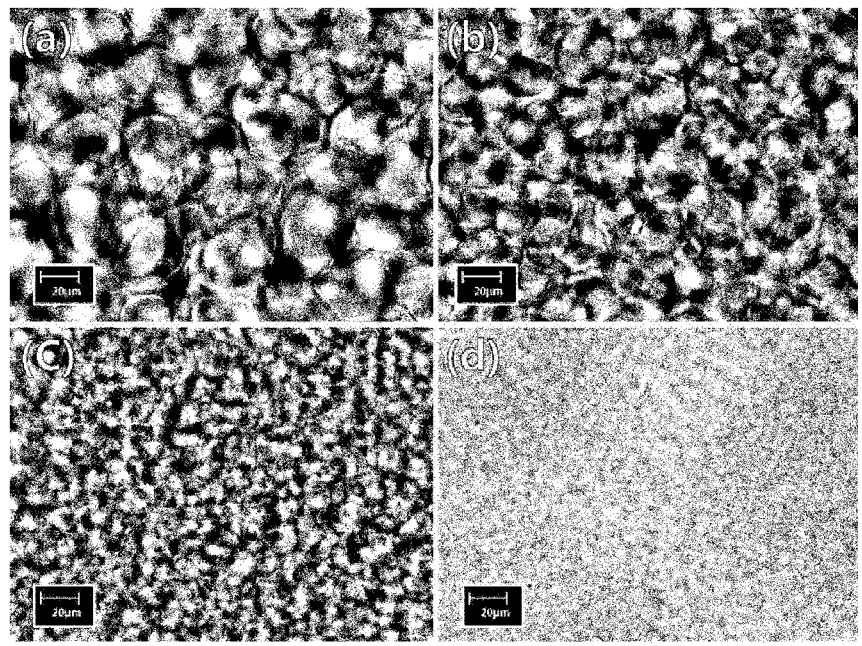
FIG. 27 shows the size and morphology of droplets for each of the following blends: (a) a blend of polyethylene//(poly(tetramethylene ether) glycol (650)/dioctyl phthalate=5/95)=20//80, (b) a blend of polyethylene//(poly(tetramethylene ether) glycol (650)/dioctyl phthalate=5/95)=30//70, (c) a blend of polyethylene//(poly(tetramethylene ether) glycol (650)/dioctyl phthalate=5/95)=40//60, and (d) a blend of polyethylene//(poly(tetramethylene ether) glycol (650)/dioctyl phthalate=5/95)=60//40.
Figure 28:
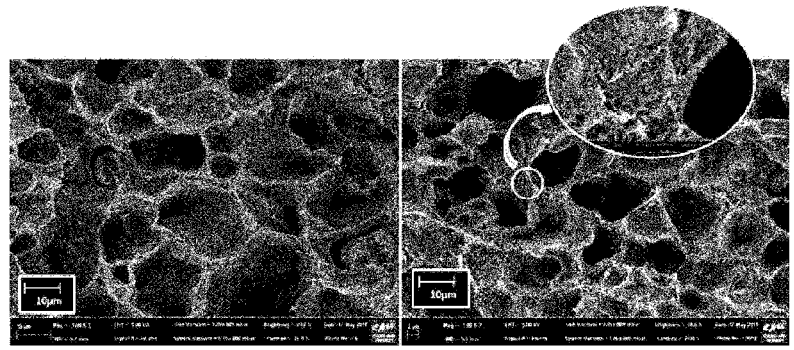
FIG. 28 shows SEM images for the structure of pores present in each polyethylene matrix after each of the following blends is cooled to a temperature less than or equivalent to a crystallization temperature of polyethylene: a blend of polyethylene//(poly(tetramethylene ether) glycol (650)/dioctyl phthalate=5/95)=20//80, and a blend of polyethylene//(poly(tetramethylene ether) glycol (1,000)/dioctyl phthalate=5/95)=40//60.

FIG. 26 shows the measurements of a phase separation temperature for blends of polyethylene//(dioctyl phthalate/poly(tetramethylene ether) glycol(650)=95/5) depending on the content of polyethylene, FIG. 27 shows the size and morphology of droplets present in blends maintained at 140° C., and FIG. 28 shows SEM photographs for the structure of pores present in each polyethylene matrix obtained from the blends.

From FIGS. 26 to 28, it can be confirmed that the more the polyethylene results in the lower the phase separation temperature, and the size of droplets and pores decrease at the same temperature (140° C.). Also, it can be confirmed that the dioctyl phthalate/poly(tetramethylene ether) glycol blend, which is remained in polyethylene areas between large pores, is eluted due to the crystallization of polyethylene, and small pores are formed in elution sites.

Figure 29:
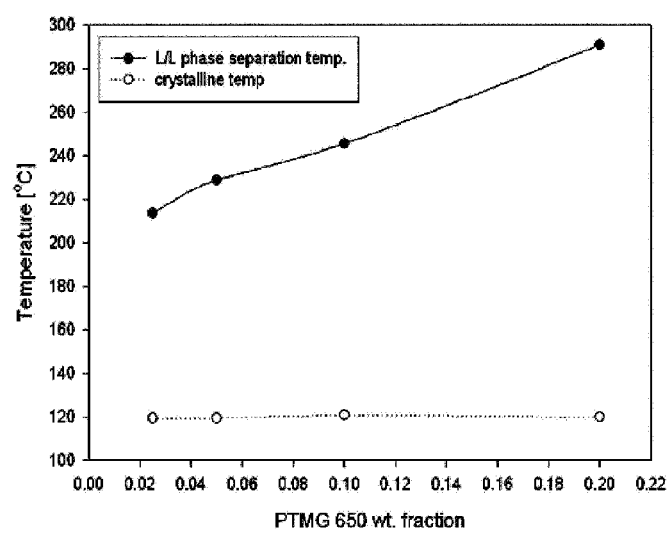
FIG. 29 shows the measurements of a phase separation temperature for blends of polyethylene//(dioctyl phthalate/poly(tetramethylene ether) glycol (PTMG) (650)=30/70) depending on the content of PTMG.

FIG. 29 shows the measurements of a phase separation temperature for blends of polyethylene//(dioctyl phthalate/poly(tetramethylene ether) glycol (650)=30/70) depending on the content of poly(tetramethylene ether) glycol.

As shown in FIG. 29, the higher the molecular weight of poly(tetramethylene ether) glycols resulted in the higher the phase separation temperature, similar to the cases using paraffin oil or soy bean oil.

Figure 30:
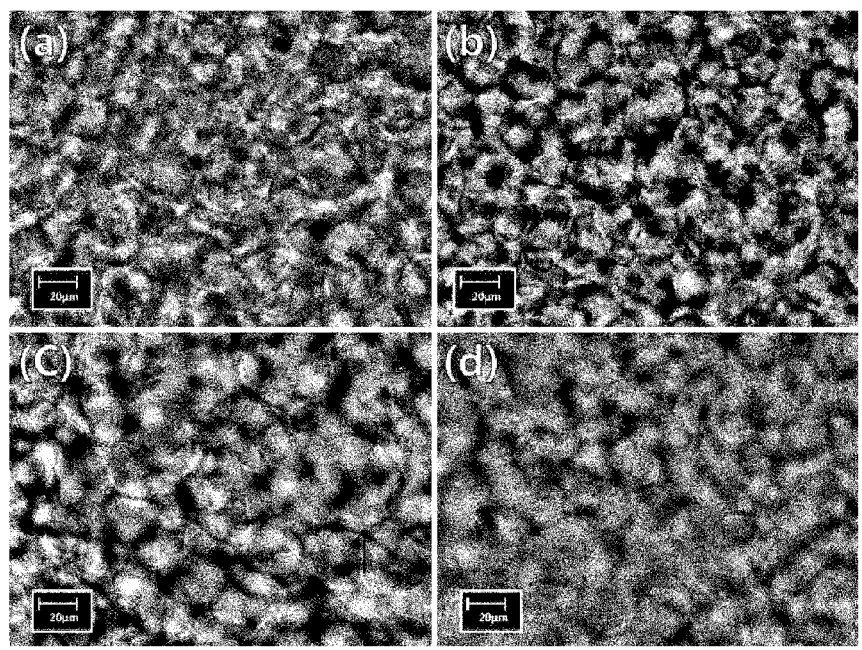
FIG. 30 shows the size and morphology of droplets for each of the following blends: (a) a blend of polyethylene//(poly(tetramethylene ether) glycol (650)/dioctyl phthalate=2.5/97.5)=30//70, (b) a blend of polyethylene//(poly(tetramethylene ether) glycol (650)/dioctyl phthalate=5/95)=30//70, (c) a blend of polyethylene//(poly(tetramethylene ether) glycol (650)/dioctyl phthalate=10/90)=30//70, and (d) a blend of polyethylene//(poly(tetramethylene ether) glycol (650)/dioctyl phthalate=15/85)=30//70.
Figure 31:
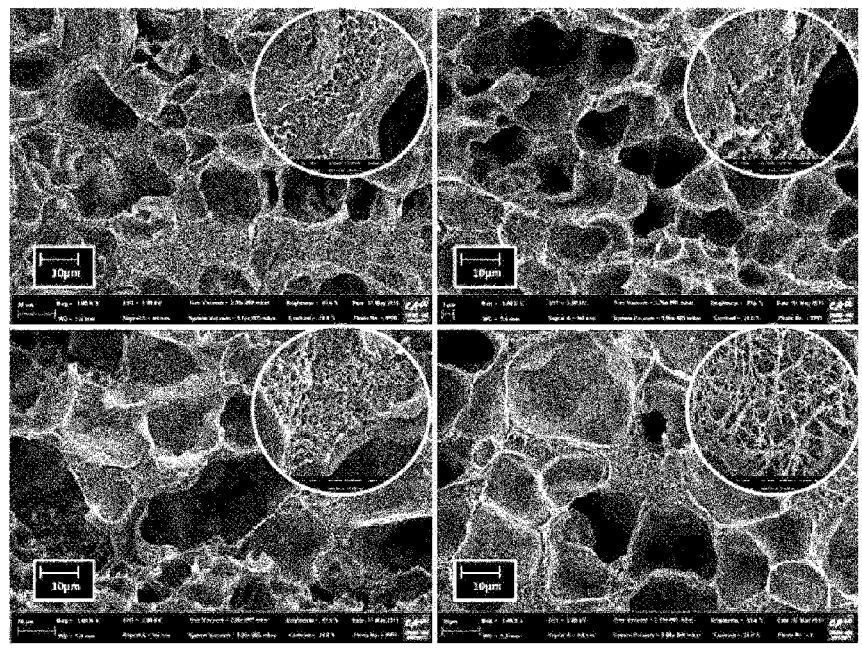
FIG. 31 shows SEM images for the structure of pores present in each polyethylene matrix after each of the following blends is cooled to a temperature less than or equivalent to a crystallization temperature of polyethylene: (a) a blend of polyethylene//(poly(tetramethylene ether) glycol (650)/dioctyl phthalate=2.5/97.5)=30//70, (b) a blend of polyethylene//(poly(tetramethylene ether) glycol (650)/dioctyl phthalate=5/95)=30//70, (c) a blend of polyethylene//(poly(tetramethylene ether) glycol (650)/dioctyl phthalate=10/90)=30//70, and (d) a blend of polyethylene//(poly(tetramethylene ether) glycol (650)/dioctyl phthalate=15/85)=30//70.

FIGS. 30 and 31 show the size and morphology of droplets observed by using an image analyzer at 140° C. for blends of polyethylene//(poly(tetramethylene ether)glycol/dioctyl phthalate=30//70, and SEM photographs for the structure of pores in each polyethylene matrix obtained from the blend, respectively.

As shown in FIG. 30, the phase separation temperature of each blend increased as the content of poly(tetramethylene ether) glycol increased, and also the size of droplets and the size of pores formed in a separator increased.

As confirmed from the above results, poly(tetramethylene ether) glycol can be used, as a new diluent, together with paraffin oil, dioctyl phthalate or soybean oil which is conventionally used in the preparation of a polyethylene separator, thereby controlling the phase separation temperature of polyethylene//(diluents/poly(tetramethylene ether) glycol) blends due to the upper critical solution temperature behavior thereof from a crystallization temperature of polyethylene from an evaporation temperature of the used diluents.

Also, an increased phase separation temperature results in an increase in the size of pores formed in a prepared polyethylene separator. From this, poly(tetramethylene ether) glycol can be used with other diluents in a mixed form, thereby controlling the size of pores formed in the polyethylene separator in the range of 0.2 to 30 μm.

The foregoing description is given by way of illustration only, and various changes and modifications within the spirit and scope of the present invention will become apparent to those skilled in the art therefrom. Therefore, the embodiments proposed herein are provided for explaining the spirit and scope of the present invention, not intended for limitation, so they should not be interpreted as limiting the scope of the invention. The scope of the present invention to be protected is defined by the appended claims, and it should be recognized that all equivalents fall within the scope of the invention as defined in the appended claims.

What is claimed is:

1. A composition for preparing a separator for an electrochemical device, comprising a polyolefin, a first diluent, and a second diluent,
   wherein an interaction energy between the first diluent and the second diluent is in the range of 2 to 3.5 cal/cm$^3$.

2. The composition for preparing a separator for an electrochemical device according to claim 1, wherein the polyolefin is selected from the group consisting of polyethylene, polypropylene, polybutylene, polypentene, and a mixture thereof.

3. The composition for preparing a separator for an electrochemical device according to claim 1, wherein the first diluent is selected from the group consisting of aliphatic hydrocarbon solvents, vegetable oils, fatty acid ester-based solvents, dialkyl phthalates and a mixture thereof.

4. The composition for preparing a separator for an electrochemical device according to claim 1, wherein the second diluent is a poly(tetramethylene ether) glycol or a polypropylene glycol.

5. The composition for preparing a separator for an electrochemical device according to claim 1, wherein the polyolefin, the first diluent and the second diluent are comprised in an amount of 20 to 50 wt %, 38 to 79 wt %, and 1 to 12 wt %, respectively.

6. The composition for preparing a separator for an electrochemical device according to claim 1, wherein the second diluent has a weight average molecular weight of 650 to 2,000.

7. A method for preparing a separator for an electrochemical device, comprising:
    blending a polyolefin, a first diluent, and a second diluent to obtain a blend, and heating the blend at a temperature exceeding the crystallization temperature of the polyolefin, to obtain a composition for preparing a separator in the form of a single-phase liquid;
    cooling the obtained single-phase liquid composition for preparing a separator to a temperature less than or equivalent to a temperature at which the blend is liquid-liquid phase separated, to carry out the phase separation of the composition; and
    extracting the first diluent and the second diluent from the phase-separated composition for preparing a separator using an extraction solvent at a temperature less than or equivalent to the crystallization temperature of the polyolefin, to obtain a separator having pores formed thereon,
    wherein an interaction energy between the first diluent and the second diluent is in the range of 2 to 3.5 cal/cm$^3$.

8. The method for preparing a separator for an electrochemical device according to claim 7, wherein the polyolefin is selected from the group consisting of polyethylene, polypropylene, polybutylene, polypentene, and a mixture thereof.

9. The method for preparing a separator for an electrochemical device according to claim 7, wherein the first diluent is selected from the group consisting of aliphatic hydrocarbon solvents, vegetable oils, fatty acid ester-based solvents, dialkyl phthalates and a mixture thereof.

10. The method for preparing a separator for an electrochemical device according to claim 7, wherein the second diluent is a poly(tetramethylene ether) glycol or a polypropylene glycol.

11. The method for preparing a separator for an electrochemical device according to claim 7, wherein the polyolefin, the first diluent and the second diluent are used in an amount of 20 to 50 wt %, 38 to 79 wt %, and 1 to 12 wt %, respectively, in the composition for preparing a separator for an electrochemical device.

12. The method for preparing a separator for an electrochemical device according to claim 7, wherein the heating of the blend is carried out at a temperature of 115 to 260° C.

13. The method for preparing a separator for an electrochemical device according to claim 7, wherein the cooling the composition for preparing a separator is carried out at a temperature of 115° C. or less.

14. A separator prepared by the method according to claim 7.

15. An electrochemical device, comprising a cathode, an anode, a non-aqueous electrolyte solution and a separator, wherein the separator is the separator according to claim 14.

* * * * *